US012806663B2

(12) United States Patent
Nomura

(10) Patent No.: US 12,806,663 B2
(45) Date of Patent: Nov. 24, 2026

(54) CLEANING METHOD

(71) Applicant: DISCO CORPORATION, Tokyo (JP)

(72) Inventor: Yutaro Nomura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 50 days.

(21) Appl. No.: 18/930,028

(22) Filed: Oct. 29, 2024

(65) Prior Publication Data

US 2025/0170618 A1 May 29, 2025

(30) Foreign Application Priority Data

Nov. 24, 2023 (JP) ................................ 2023-199032

(51) Int. Cl.

*B08B 1/00* (2024.01)
*B08B 3/02* (2006.01)
*B08B 3/04* (2006.01)
*B08B 3/10* (2006.01)

(52) U.S. Cl.

CPC ................ *B08B 3/041* (2013.01); *B08B 3/02* (2013.01); *B08B 3/102* (2013.01); *B08B 2203/02* (2013.01)

(58) Field of Classification Search

None

See application file for complete search history.

(56) References Cited

U.S. PATENT DOCUMENTS 10,332,758 B2 * 6/2019 Nakamura .......... H10P 72/0414

FOREIGN PATENT DOCUMENTS

CN 102553862 A * 7/2012 ............... B08B 7/02
JP 2015109381 A 6/2015

* cited by examiner

*Primary Examiner* — Eric W Golightly
(74) *Attorney, Agent, or Firm* — GREER BURNS & CRAIN, LTD.

(57) ABSTRACT

A method of cleaning a clean-up target with a spinner cleaning apparatus includes a holding step of holding the clean-up target on a holding surface of a holding table of the spinner cleaning apparatus, the holding table being rotatable about a rotational shaft perpendicular to the holding surface, and a first treating step of cleaning or drying a local region of the clean-up target held on the holding surface of the holding table with first fluid supplied from a first nozzle of the spinner cleaning apparatus by combining turning of the holding table about the rotational shaft through an indicated rotational angle and movement of the first nozzle relative to the rotational shaft with each other.

8 Claims, 16 Drawing Sheets

CLEANING METHOD

BACKGROUND OF THE INVENTION

Field of the Invention

The present invention relates to a method of cleaning a workpiece to be cleaned, hereinafter referred to as a "clean-up target," with a spinner cleaning apparatus and a spinner cleaning apparatus for cleaning a clean-up target.

Description of the Related Art

For processing a wafer with a processing apparatus such as a cutting apparatus or a laser processing apparatus, for example, first, grooves are formed in the wafer along a grid of projected dicing lines established on a face side of the wafer. Then, the wafer is cleaned by a spinner cleaning apparatus to remove particles of dirt, dust, and swarf produced when the grooves were formed from the wafer (see, for example, Japanese Patent Laid-Open No. 2015-109381). For cleaning the wafer with the spinner cleaning apparatus, a holding table with the wafer held under suction on its upper surface is rotated about its central axis, and at the same time, a cleaning nozzle that is ejecting cleaning fluid toward the wafer is moved back and forth over the holding table along an arcuate track from a point on the outer peripheral edge of the holding table via the center of the upper surface of the holding table to another point on the outer peripheral edge of the holding table.

The grooves described above are arranged in a pattern in the shape of a grid and exposed on the face side of the wafer. Each of the grooves has a width of approximately 50 μm and a depth of approximately 500 μm. During the process of cleaning the wafer, usually, the cleaning nozzle ejects the cleaning fluid to the wafer while the holding table that is holding the wafer is rotating at a relatively high speed, e.g., 800 rpm. Therefore, the cleaning fluid is less liable to reach the bottoms of the grooves and the side surfaces of the grooves near their bottoms than the exposed openings of the grooves and nearby zones. In addition, foreign matter that may unevenly be present in some longitudinally spaced regions of the bottoms and/or the side surfaces of the grooves are hard to remove sufficiently when the wafer is cleaned by the cleaning fluid while the holding table is rotating at a relatively high speed.

As described above, the local regions including the bottoms of the grooves, the side surfaces of the grooves, and the longitudinally spaced regions thereof cannot be fully cleaned, simply when the face side of the wafer is cleaned by the cleaning fluid applied thereto. Moreover, the above cleaning process fails to fulfil a request to locally dry some regions of the wafer.

SUMMARY OF THE INVENTION

The present invention is made in view of such a circumstance, and it is therefore an object of the present invention to provide a method of cleaning a clean-up target such as a wafer with a spinner cleaning apparatus in a manner to locally clean or dry some regions of the clean-up target and a spinner cleaning apparatus that performs the method.

In accordance with an aspect of the present invention, there is provided a method of cleaning a clean-up target with a spinner cleaning apparatus, including a holding step of holding the clean-up target on a holding surface of a holding table of the spinner cleaning apparatus, the holding table being rotatable about a rotational shaft perpendicular to the holding surface, and a first treating step of cleaning or drying a local region of the clean-up target held on the holding surface of the holding table with first fluid supplied from a first nozzle of the spinner cleaning apparatus by combining turning of the holding table about the rotational shaft through an indicated rotational angle and movement of the first nozzle relative to the rotational shaft with each other.

Preferably, the first treating step includes cleaning or drying the clean-up target held on the holding surface of the holding table with the first fluid along a straight clean-up region thereof by combining turning of the holding table through the rotational angle and movement of the first nozzle relative to the rotational shaft with each other.

Preferably, the clean-up region corresponds to a straight projected dicing line on an upper surface of the clean-up target, and the first treating step includes cleaning or drying the clean-up target with the first fluid along the projected dicing line.

Preferably, the clean-up region corresponds to a straight projected dicing line on an upper surface of the clean-up target, and the first treating step includes cleaning or drying the clean-up target with the first fluid at least at a longitudinal end of the projected dicing line.

Preferably, the method further includes, after the holding step and before the first treating step, a second treating step of cleaning the overall region of an upper surface of the clean-up target by ejecting second fluid from a second nozzle of the spinner cleaning apparatus while rotating the holding table that is holding the clean-up target on the holding surface thereof about the rotational shaft at an indicated rotational speed and by moving the second fluid ejected from the second nozzle relatively to the holding table along a path that extends from an outer circumferential edge of the holding table or an outer circumferential edge of the clean-up target held on the holding surface to the center of the holding table.

Preferably, the first treating step includes cleaning the local region of the clean-up target with the first fluid, and the method further includes, after the holding step, a second treating step of cleaning the overall region of an upper surface of the clean-up target by ejecting second fluid from a second nozzle of the spinner cleaning apparatus while rotating the holding table that is holding the clean-up target on the holding surface thereof about the rotational shaft at an indicated rotational speed and by moving the second fluid ejected from the second nozzle relatively to the holding table along a path that extends from an outer circumferential edge of the holding table or an outer circumferential edge of the clean-up target held on the holding surface to the center of the holding table.

Preferably, in a case where the first fluid cleans the local region of the clean-up target in the first treating step, the first fluid includes pure water, and the method further includes, after the first treating step, a local region drying step of drying the local region that has been cleaned with air that is different from the first fluid by combining turning of the holding table through the rotational angle and movement of the first nozzle relative to the rotational shaft with each other.

In accordance with another aspect of the present invention, there is provided a spinner cleaning apparatus including a holding table having a holding surface for holding a clean-up target thereon, a rotating mechanism having a rotational shaft extending perpendicularly to the holding surface and fixed to the holding table, a cleaning unit having a first nozzle for ejecting first fluid, a moving mechanism including at least one electric motor, the moving mechanism being capable of moving the first fluid ejected from the first nozzle relatively to the clean-up target on the holding surface along a path that extends from an outer circumferential edge of the holding table or an outer circumferential edge of the clean-up target held on the holding surface to the center of the holding table, and a controller having a memory and a processor, for controlling the holding table, the rotating mechanism, the cleaning unit, and the moving mechanism in operation. The controller executes a program stored in the memory to perform a first treating step of cleaning or drying a local region of the clean-up target held on the holding surface of the holding table with the first fluid supplied from the first nozzle by combining turning of the holding table about the rotational shaft through an indicated rotational angle and movement of the first nozzle relative to the rotational shaft with each other.

Preferably, the controller cleans or dries the clean-up target held on the holding surface of the holding table with the first fluid along a straight clean-up region thereof by combining turning of the holding table through the rotational angle and movement of the first nozzle relative to the rotational shaft with each other.

Preferably, the controller indicates the rotational angle on the basis of an orientation of the clean-up target held on the holding surface and a position of the first nozzle relative to the holding surface.

Preferably, the cleaning unit further has a second nozzle for ejecting second fluid, the second nozzle being different from the first nozzle, the moving mechanism is capable of moving the second fluid ejected from the second nozzle relatively to the clean-up target held on the holding surface, and the controller performs a second treating step of cleaning the overall region of an upper surface of the clean-up target with the second fluid by ejecting the second fluid from the second nozzle while rotating the holding table that is holding the clean-up target on the holding surface thereof about the rotational shaft at an indicated rotational speed and by moving the second fluid ejected from the second nozzle relatively to the clean-up target along a path that extends from an outer circumferential edge of the holding table or an outer circumferential edge of the clean-up target held on the holding surface to the center of the holding table.

Preferably, the controller performs a second treating step of cleaning the overall region of an upper surface of the clean-up target with the first fluid by ejecting the first fluid from the first nozzle while rotating the holding table that is holding the clean-up target on the holding surface thereof about the rotational shaft at an indicated rotational speed and by moving the first fluid ejected from the first nozzle relatively to the clean-up target along a path that extends from an outer circumferential edge of the holding table or an outer circumferential edge of the clean-up target held on the holding surface to the center of the holding table.

The method of cleaning a clean-up target and the spinner cleaning apparatus according to the aspects of the present invention are capable of cleaning or drying the local region of the clean-up target held on the holding surface of the holding table with the first fluid supplied from the first nozzle of the spinner cleaning apparatus by combining turning of the holding table about the rotational shaft through the indicated rotational angle and movement of the first nozzle relative to the rotational shaft with each other.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

First Embodiment

Figure 1:
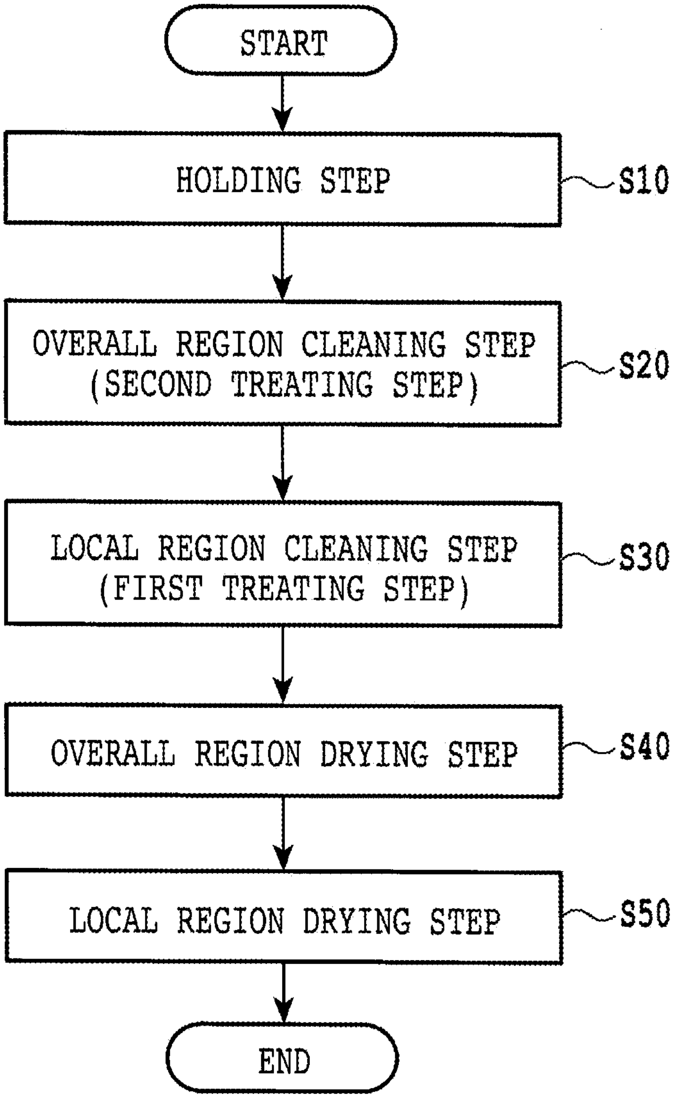
FIG. 1 is a flowchart of a method of cleaning a clean-up target, also referred to as "clean-up target cleaning method," according to a first embodiment of the present invention.

A method of cleaning a clean-up target, also referred to as a "clean-up target cleaning method," according to a first embodiment of the present invention will be described below with reference to FIGS. 1 through 11B. FIG. 1 is a flowchart of the clean-up target cleaning method according to the first embodiment that cleans a clean-up target 23 (see FIG. 3) with a spinner cleaning apparatus 30 (see FIG. 2). According to the present embodiment, as illustrated in FIG. 1, the clean-up target cleaning method includes a holding step S10, an overall region cleaning step (second treating step) S20, a local region cleaning step (first treating step) S30, an overall region drying step S40, and a local region drying step S50, which will be executed in this manner. First, a cutting apparatus 2 that incorporates the spinner cleaning apparatus 30 will be described hereinbelow with reference to FIG. 2.

Figure 2:
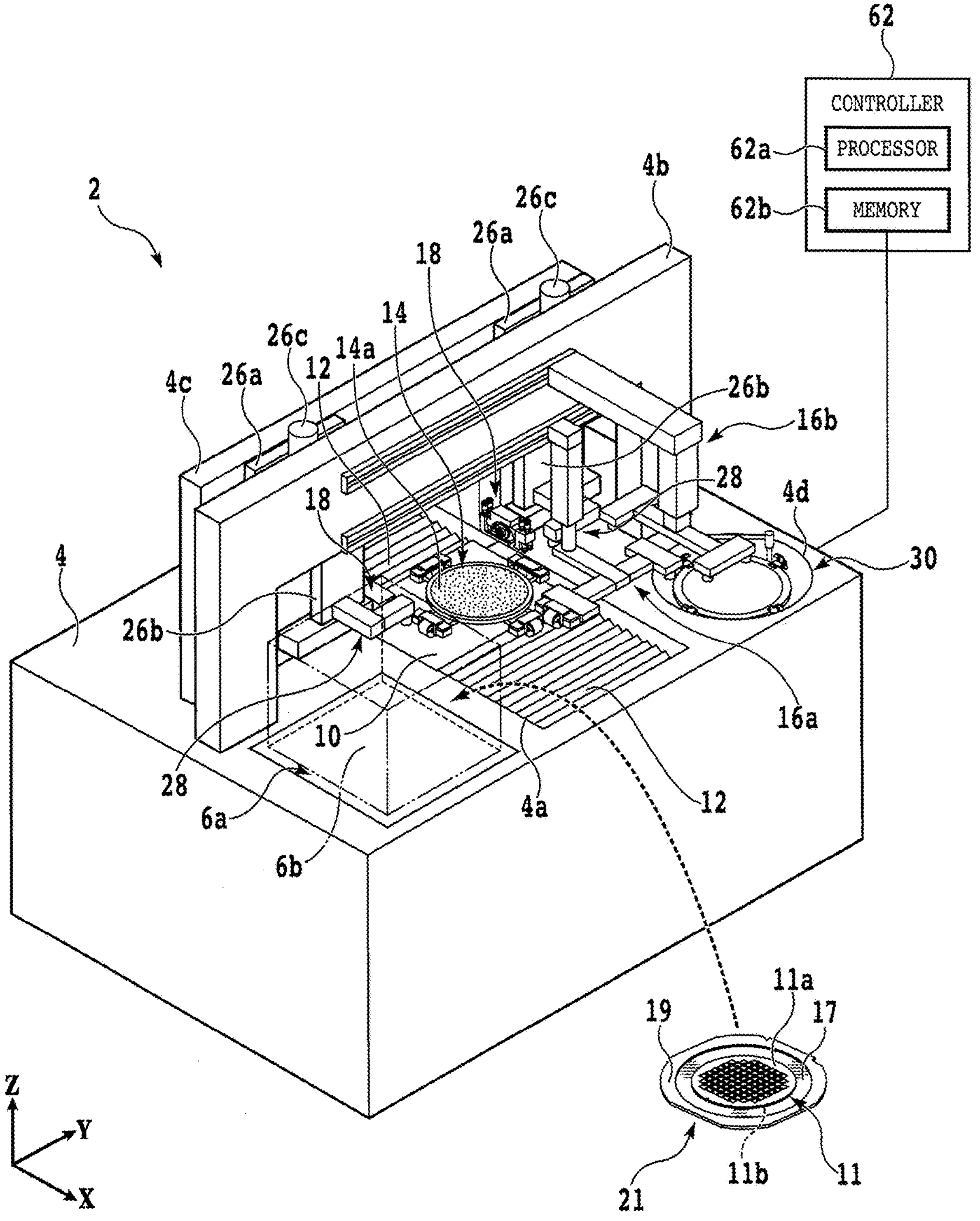
FIG. 2 is a perspective view, partly in block form, of a cutting apparatus.

As illustrated in FIG. 2, the cutting apparatus 2 is depicted in reference to a three-dimensional coordinate system including an X-axis indicated by the arrow X and representing horizontal processing feed directions, a Y-axis indicated by the arrow Y and representing horizontal indexing feed directions, and a Z-axis indicated by the arrow Z and representing vertical directions. The X-axis, the Y-axis, and the Z-axis extend perpendicularly to each other. In FIG. 2, some components of the cutting apparatus 2 are illustrated in functional block form. FIG. 2 is a perspective view of the cutting apparatus 2. The cutting apparatus 2 includes a foundation base 4 that supports or houses the components thereof. The foundation base 4 has four corners one of which houses a cassette elevator 6*a* therein.

The cassette elevator 6*a* lifts and lowers a cassette 6*b* shaped as a rectangular parallelepiped vertically along the Z-axis. The cassette 6*b* accommodates therein a plurality of workpieces 11 to be cut, cleaned, and dried on the cutting apparatus 2. Each of the workpieces 11 includes, for example, a disk-shaped wafer made of a semiconductor material such as silicon, though it is not limited to any particular material, shape, structure, and size. Substrates made of any of other materials such as semiconductor, ceramic, resin, and metal, for example, may be used as the workpieces 11.

Each of the workpieces 11 has a face side 11*a* with a grid of projected dicing lines 13 (see FIG. 3) established thereon. The projected dicing lines 13 demarcate a plurality of areas on the face side 11*a* where respective devices 15 (see FIG. 3) such as integrated circuits (ICs) are formed. The devices 15 are not limited to any particular kind, number, shape, structure, size, and layout. The workpiece 11 may even be free of the devices 15.

The workpiece 11 has a reverse side 11*b* affixed to a circular dicing tape 17 of resin that is larger in diameter than the workpiece 11. The dicing tape 17 has an outer circumferential portion to which a ring frame 19 of metal is fixed. The workpiece 11 is thus supported by the ring frame 19 through the dicing tape 17, jointly making up a frame unit 21. The workpieces 11 accommodated in the cassette 6*b* have been preassembled in the respective frame units 21.

As illustrated in FIG. 2, the foundation base 4 has an elongate opening 4*a* defined centrally in an upper surface thereof and extending longitudinally along the X-axis. A rectangular table cover 10 is disposed centrally in the opening 4*a*. Two bellows-shaped covers 12 that are extensible and contractible along the X-axis are disposed in the opening 4*a* respectively on the opposite sides of the table cover 10 along the X-axis. A disk-shaped chuck table 14 is fixedly mounted on an upper surface of the table cover 10.

The chuck table 14 includes a disk-shaped frame, not depicted, made of metal. The frame has a circular recess, not depicted, defined centrally therein that is exposed upwardly. A disk-shaped porous plate made of porous ceramic and essentially identical in diameter to the recess is fixedly mounted in the recess. The foundation base 4 houses therein a suction source, not depicted, such as a vacuum pump and fluidly connected through the frame to the recess and hence the porous plate. When the suction pump is actuated, it generates and transmits a negative pressure to the porous plate where it acts on an upper surface of the porous plate for holding the workpiece 11 under suction on the upper surface of the porous plate. The frame has an upper surface that lies substantially flush with the upper surface of the porous plate. The upper surfaces of the frame and the porous plate jointly provide a holding surface 14*a* extending substantially parallel to an XY plane that is defined along the X-axis and the Y-axis.

The chuck table 14 is disposed above and mechanically coupled to a rotating mechanism, not depicted, including an electric motor. When the rotating mechanism is energized, it rotates the chuck table 14 about its vertical central axis parallel to the Z-axis through a desired angle. The chuck table 14, the table cover 10, and the rotating mechanism are supported on a ball-screw X-axis moving mechanism, not depicted, housed in the foundation base 4. When the X-axis moving mechanism is actuated, it moves the chuck table 14 and the table cover 10 along the X-axis, causing the covers 12 to expand and contract in a manner to follow the position of the chuck table 14.

Two portal-shaped support structures 4*b* and 4*c* are mounted on the foundation base 4 in overhanging relation to the opening 4*a* along the Y-axis. The support structures 4*b* and 4*c* extend along the Y-axis and are spaced from each other along the X-axis. A first delivery unit 16*a* for delivering the frame unit 21 while gripping or attracting it under suction between the cassette 6*b* and the chuck table 14 is mounted on a surface of the support structure 4*b* that faces in a direction along the X-axis. A second delivery unit 16*b* for delivering the frame unit 21 while attracting it under suction from the chuck table 14 to the spinner cleaning apparatus 30 is also mounted on the surface of the support structure 4*b* in a manner being out of physical interference with the first delivery unit 16*a*. The spinner cleaning apparatus 30 cleans the frame unit 21 that has been delivered from the chuck table 14. The frame unit 21 that has been cleaned by the spinner cleaning apparatus 30 is delivered from the spinner cleaning apparatus 30 back to the chuck table 14 by the first delivery unit 16*a*.

A pair of cutting unit moving mechanisms, partly depicted, for moving respective cutting units 18 along the Y-axis and the Z-axis are mounted on a surface of the support structure 4*c* that faces in a direction along the X-axis. The cutting unit moving mechanisms include a pair of Y-axis guide rails, not depicted, extending along the Y-axis and parallel to each other. The cutting unit moving mechanisms include respective Y-axis movable plates 26*a* slidably mounted on the Y-axis guide rails for sliding movement along the Y-axis.

Each of the Y-axis movable plates 26*a* has a nut, not depicted, mounted on a reverse side thereof that faces the support structure 4*c*. The nuts of the Y-axis movable plates 26*a* are operatively threaded over a single screw shaft, not depicted, extending along the Y-axis with a plurality of balls, not depicted, rollingly interposed between the nuts and the screw shaft. The screw shaft has an end coupled to a stepping motor, not depicted. When the stepping motor is energized, it rotates the screw shaft about its central axis, causing the nuts to move the Y-axis movable plates 26*a* along the Y-axis.

A Z-axis guide rail, not depicted, extending substantially parallel to the Z-axis is fixedly mounted on a face side of each of the Y-axis movable plates 26*a* that faces away from the support structure 4*c* along the X-axis. A Z-axis movable plate 26*b* is slidably mounted on the Z-axis guide rail for sliding movement along the Z-axis. The Z-axis movable plate 26*b* has a nut, not depicted, mounted on a reverse side thereof that faces the Y-axis movable plate 26*a*. The nut is operatively threaded over a single screw shaft, not depicted, extending along the Z-axis with a plurality of balls, not depicted, rollingly interposed between the nut and the screw shaft.

The screw shaft has an upper end coupled to a stepping motor 26*c*. When the stepping motor 26*c* is energized, it rotates the screw shaft about its central axis, causing the nut to move the Z-axis movable plate 26*b* along the Z-axis. The cutting units 18 referred to above are fixedly mounted on respective lower ends of the Z-axis movable plates 26*b*. Each of the cutting units 18 has a spindle housing shaped as a rectangular parallelepiped that extends longitudinally along the Y-axis. A cylindrical spindle, not depicted, that extends longitudinally along the Y-axis is partly housed in the spindle housing.

The spindle is rotatably supported by the spindle housing by an air bearing, not depicted, for example. A stator, not depicted, is disposed in the spindle housing in surrounding relation to a side surface of the spindle, which functions as a rotor. The spindle has a distal end portion that projects out of the spindle housing along the Y-axis. A cutting blade having an annular cutting edge is mounted on the distal end portion of the spindle.

A blade cover, not depicted, is mounted on a distal end portion of the spindle housing. The blade cover includes a pair of L-shaped cooler nozzle units disposed in sandwiching relation to the face and reverse sides of the cutting blade and a shower nozzle unit disposed in confronting relation to an outer circumferential surface of the cutting blade.

For cutting the workpiece 11 with one of the cutting units 18, the chuck table 14 is adjusted in orientation about its vertical central axis by the rotating mechanism to make a first group of the projected dicing lines 13 that extend in a first direction substantially parallel to the X-axis, and then one of the cutting unit moving mechanisms is actuated to bring the lower end of the cutting blade that is being rotated at a high speed by the spindle to a predetermined vertical position between the face side 11*a* and the holding surface 14*a* in a zone that is spaced radially outwardly from the holding surface 14*a* and the cutting unit moving mechanism is actuated to adjust the position of the cutting blade along the Y-axis.

Figure 3:
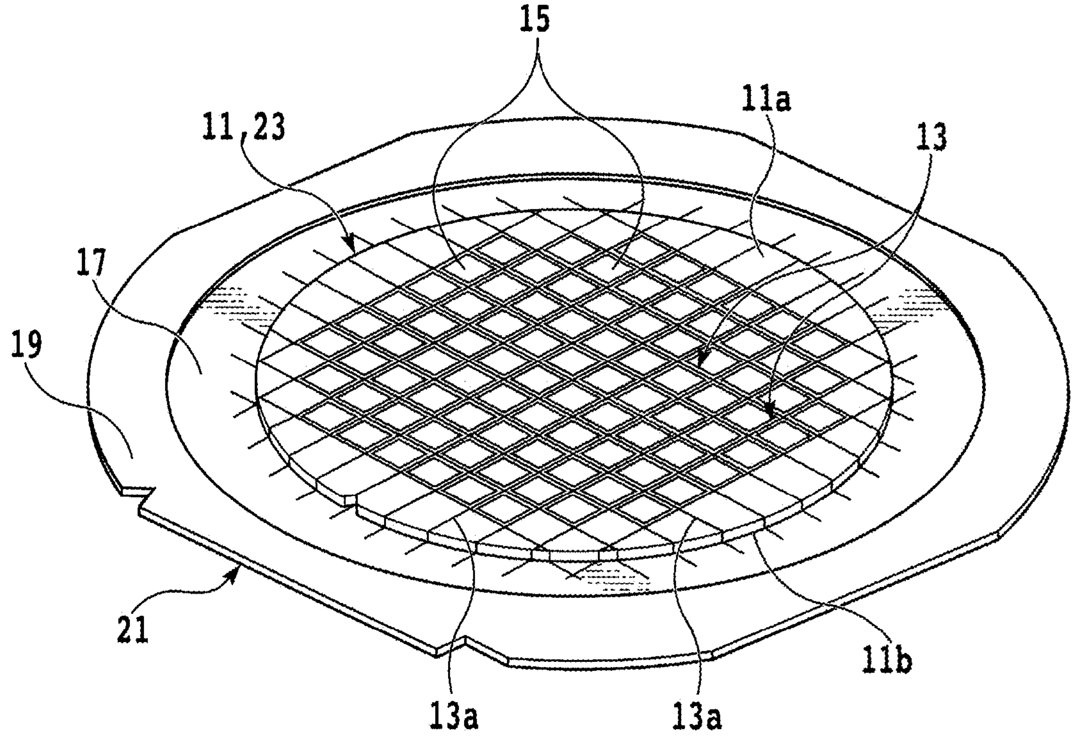
FIG. 3 is an enlarged perspective view of the clean-up target.

After the cutting blade and the workpiece 11 have been adjusted in their relative position, the chuck table 14 is moved along the X-axis by the X-axis moving mechanism to form a cut groove 13*a* in the workpiece 11 along one of the projected dicing lines 13, as illustrated in FIG. 3. While the cutting blade is being rotated, cutting water such as pure water is continuously supplied from the cooler nozzle units and the shower nozzle unit to the cutting blade. The cutting unit moving mechanism is actuated again to move the cutting unit 18 along the Y-axis by a predetermined indexed distance, after which the cutting unit 18 forms a cut groove 13*a* in the workpiece 11 along another projected dicing line 13 of the first group in the same manner as described above.

After cut grooves 13*a* have been formed in the workpiece 11 along all the projected dicing lines 13 of the first group, the chuck table 14 is turned about its vertical central axis through substantially 90 degrees by the rotating mechanism. Then, cut grooves 13*a* are similarly formed in the workpiece 11 along all the projected dicing lines 13 of a second group that extend in a second direction perpendicular to the first direction. According to the present embodiment, the workpiece 11 with the cut grooves 13*a* defined therein along all the projected dicing lines 13 will be referred to as a "clean-up target 23" to be cleaned by the spinner cleaning apparatus 30.

FIG. 3 illustrates the clean-up target 23 in perspective. According to the present embodiment, the cut grooves 13*a* illustrated in FIG. 3 represent grooves each having a depth large enough to extend fully from the face side 11*a* to the reverse side 11*b*, referred to as "fully cut grooves." However, the cut grooves 13*a* may alternatively represent grooves each having a depth extending from the face side 11*a* but terminating short of the reverse side 11*b*, referred to as "half-cut grooves."

The cutting apparatus 2 will further be described below with reference to FIG. 2. In addition to the cutting units 18, microscope camera units 28 are fixedly mounted on the respective lower ends of the Z-axis movable plates 26*b*. Each of the microscope camera units 28, which includes a lens, a solid-state image capturing unit, and the like, captures an image of a subject such as the workpiece 11 held on the holding surface 14*a*, by visible light, for example. The image obtained by capturing the workpiece 11 held on the holding surface 14*a* by the microscope camera units 28 will be used in adjusting the orientation of the chuck table 14, adjusting the relative position of the cutting blade and the workpiece 11, and performing a kerf check, for example.

Figure 4:
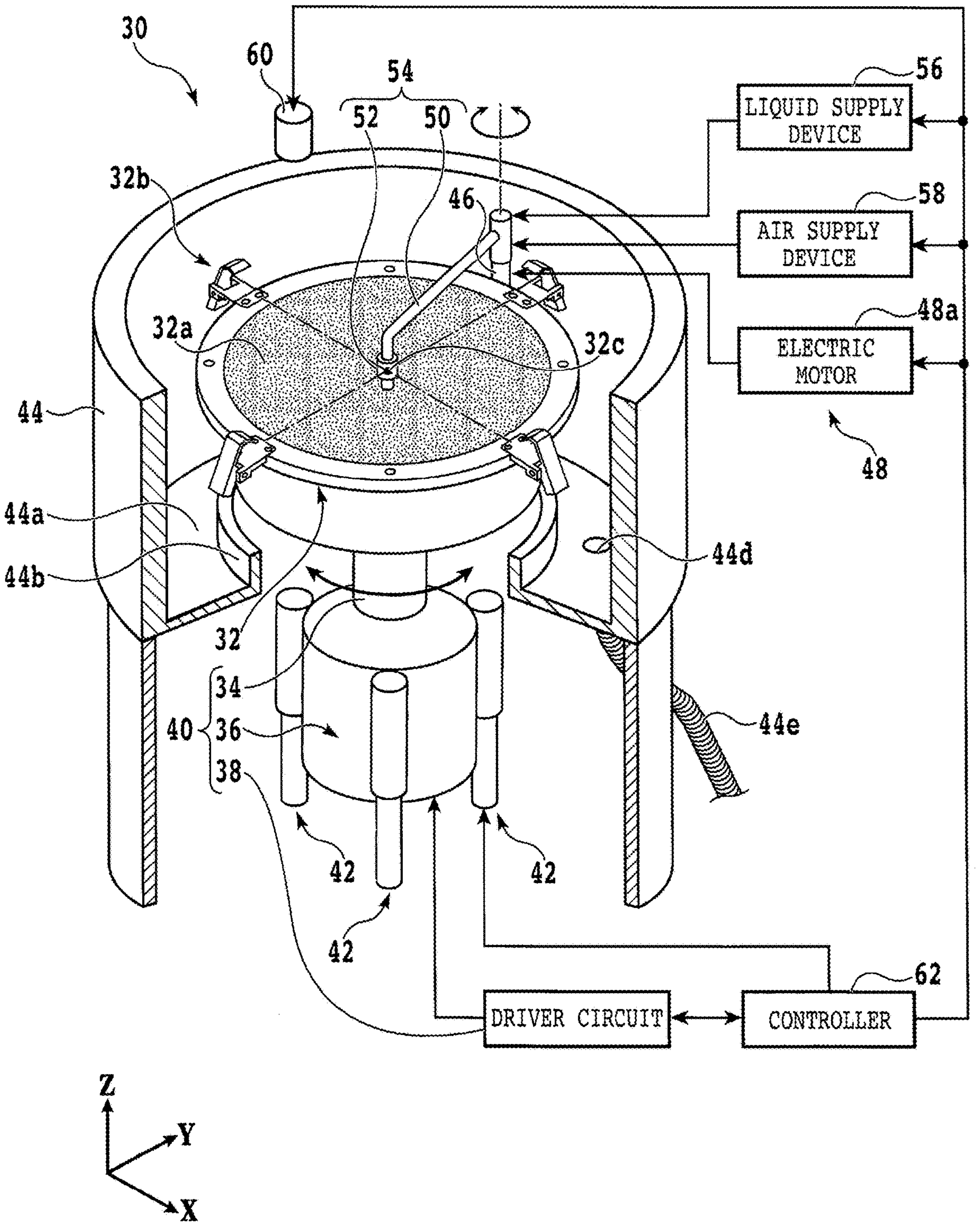
FIG. 4 is an enlarged perspective view of a spinner cleaning apparatus.

The foundation base 4 has a circular opening 4*d* defined in an upper surface thereof and positioned across the opening 4*a* from the cassette elevator 6*a* in the Y-axis. The spinner cleaning apparatus 30 for cleaning the clean-up target 23 is disposed in the opening 4*d*. FIG. 4 illustrates the spinner cleaning apparatus 30 in perspective. In FIG. 4, some components of the spinner cleaning apparatus 30 are illustrated in functional block form.

The spinner cleaning apparatus 30 includes a disk-shaped spinner table 32 as a holding table. As with the chuck table 14 described above, the spinner table 32 includes a disk-shaped frame made of metal and a disk-shaped porous plate made of porous ceramic. The frame has a recess defined therein and exposed upwardly, and a porous plate that is substantially identical in diameter to the recess is fixedly mounted in the recess.

The negative pressure generated by the suction source described above is also transmitted to the porous plate of the spinner table 32 and acts on an upper surface of the porous plate for holding the clean-up target 23 under suction thereon. The frame and the porous plate have respective upper surfaces that jointly provide a holding surface 32*a* extending substantially parallel to an XY plane. A plurality of (four in FIG. 4) swingable clamps **32*b* are disposed at spaced intervals on an outer circumferential portion of the holding surface 32*a*. The swingable clamps 32*b* have respective claws whose tip ends are swingable downwardly toward the holding surface 32*a*. When the spinner table 32 rotates about its vertical central axis at a predetermined speed or higher, the tip ends of the claws of the clamps 32*b* are pressed downwardly toward the holding surface 32*a* under centrifugal forces, gripping the ring frame 19 of the frame unit 21 between the holding surface 32*a* and clamps 32*b***.

The spinner table 32 has a bottom plate, not depicted, having a diametrically centrally portion securely coupled to the upper end of a vertical rotational shaft 34 whose longitudinal central axis extends substantially parallel to the Z-axis. The rotational shaft 34 extends perpendicularly to the holding surface **32*a*. The longitudinal central axis of the rotational shaft 34 is substantially aligned with the center, denoted by 32*c*, of the holding surface 32*a*. The rotational shaft 34 that is fixed to the spinner table 32 is rotated about its central axis by an electric motor, e.g., a servomotor, 36 when the latter is energized. The electric motor 36 has its output shaft aligned with and coupled to the lower end of the rotational shaft 34**.

The electric motor 36 is electrically connected to a controller 62 to be described later via a driver circuit 38. The controller 62 sends a pulsed signal representing alternate high and low voltage levels to the driver circuit 38 for controlling the rotation of the electric motor 36, i.e., the rotational shaft 34. Specifically, the controller 62 adjusts the number of revolutions per minute (rpm), i.e., the rotational speed, of the electric motor 36, i.e., the spinner table 32, with the number of pulses per unit time of the pulsed signal, and the controller 62 also adjusts an angle, i.e., a rotational angle (degrees), through which to rotate the spinner table 32 in the XY plane with the number of pulses per unit time of the pulsed signal input to the driver circuit 38.

The electric motor 36 incorporates therein a rotary encoder, not depicted, capable of detecting the rotational speed and the rotational angle of the rotational shaft 34. The rotational shaft 34, the electric motor 36, the driver circuit 38, the rotary encoder, and the like jointly make up a rotational drive mechanism 40 for rotating the spinner table 32 under control. When the driver circuit 38 is supplied with a pulsed signal representing a rotational speed indicated by the controller 62, the driver circuit 38 supplies electric power to the electric motor 36 to achieve the rotational speed. At this time, the actual rotational speed of the rotational shaft 34 that is detected by the rotary encoder is fed back to the driver circuit 38.

If the actual rotational speed sent to the driver circuit 38 is different from the rotational speed represented by the pulsed signal, then the driver circuit 38 adjusts the electric power supplied to the electric motor 36 to achieve the rotational speed indicated by the controller 62. In addition, when the driver circuit 38 is supplied with a rotational angle indicated by the controller 62, the driver circuit 38 supplies electric power to the electric motor 36 to achieve the rotational angle. At this time, the actual rotational angle of the rotational shaft 34 that is detected by the rotary encoder is fed back to the driver circuit 38.

If the actual rotational angle sent to the driver circuit 38 is different from the rotational angle indicated by the controller 62, then the driver circuit 38 adjusts the electric power supplied to the electric motor 36 to achieve the rotational angle indicated by the controller 62.

The electric motor 36 is housed in a tubular casing. A plurality of (three in FIG. 4) vertical air cylinders 42 are mounted at spaced intervals on an outer circumferential surface of the tubular casing. The air cylinders 42 have respective piston rods that can be extended and retracted over respective vertical distances by the controller 62. The controller 62 can control the spinner table 32 to move upwardly and downwardly by adjusting the distances that the piston rods of the air cylinders 42 are vertically moved. For example, when the clean-up target 23 is to be loaded onto or unloaded from the spinner table 32, the controller 62 places the spinner table 32 in a relatively high position, and when the clean-up target 23 on the spinner table 32 is to be cleaned or dried, the controller 62 places the spinner table 32 in a relatively low position.

The spinner cleaning apparatus 30 further includes a hollow cylindrical outer cover 44 disposed radially outwardly of the spinner table 32. The outer cover 44 includes a vertical circular wall. An annular bottom plate **44*a* has an outer circumferential edge and the outer circumferential edge of the annular bottom plate 44*a* is fixed to an inner circumferential surface of the vertical circular wall of the outer cover 44. The bottom plate 44*a* has an inner circumferential edge and the inner circumferential edge of the bottom plate 44*a* is fixed to a circular inner wall 44*b* extending upwardly from an inner circumferential edge thereof and spaced radially inwardly from the circular wall of the outer cover 44. The circular wall of the outer cover 44, the bottom plate 44*a*, and the inner wall 44*b* jointly function as an annular water reservoir for temporarily storing liquid used by the spinner cleaning apparatus 30. The bottom plate 44*a* has a drain hole 44*d* defined therein that is connected to a drain hose 44*e* extending downwardly from the bottom plate 44*a*. The used liquid is stored in the water reservoir and drained through the drain hose 44*e***.

A relatively thin rotational shaft 46 is positioned between the spinner table 32 and the circular wall of the outer cover 44 as viewed in plan. The rotational shaft 46 has a longitudinal central axis extending substantially parallel to the Z-axis. The rotational shaft 46 has a lower end coupled to an electric motor **48*a* that rotates the rotational shaft 46 about its longitudinal central axis through a predetermined angular range. The electric motor 48*a* is controlled by the controller 62 to turn the rotational shaft 46 about its longitudinal central axis not in one direction only, but reversibly, i.e., alternately in one direction and another opposite direction. Therefore, the electric motor 48*a* functions as part of a swinging mechanism, i.e., a moving mechanism, 48 for swinging a cleaning unit 54**, to be described below, back and forth.

A hollow arm 50 that extends perpendicularly to the rotational shaft 46 has a proximal end fixed to an upper end portion of the rotational shaft 46. A nozzle, which functions as a first nozzle and a second nozzle, 52 having an ejection port oriented directly below along the Z-axis is fixed to a distal end portion of the arm 50 that is remote from the rotational shaft 46. The arm 50 and the nozzle 52 have fluid passages defined therein that are fluidly connected to each other, and jointly make up a cleaning unit 54. According to the present embodiment, the ejection port of the nozzle 52 is oriented directly below along the Z-axis, as described above. However, the ejection port of the nozzle 52 may be slightly inclined to the Z-axis.

When the swinging mechanism 48 turns the rotational shaft 46 about its longitudinal central axis, the nozzle 52 on the arm 50 connected to the rotational shaft 46 swings back and forth along an arcuate path having a predetermined length across the center of the holding surface **32*a* in an XY plane. At this time, the nozzle 52 ejects fluid, i.e., first fluid or second fluid, such as liquid, gas, or a gas-liquid mixture. The nozzle 52 is fluidly connected to a liquid supply device 56 that supplies liquid and an air supply device 58 that supplies air. Normally, the liquid supply device 56 and the air supply device 58 are provided as one set in a factory or a building where the cutting apparatus 2 is installed. However, the liquid supply device 56 and the air supply device 58 may be provided as one set in combination with the spinner cleaning apparatus 30**.

The liquid supply device 56 has a tank, not depicted, for storing liquid such as pure water, acid cleaning liquid, or alkaline cleaning liquid, and a pump, not depicted, for delivering the liquid from the tank to the nozzle 52. The air supply device 58 has an air compressor, not depicted, for introducing and compressing air, a tank, not depicted, for storing compressed air, and a filter, not depicted, for removing dust particles from air. Specifically, the fluid that is ejected from the nozzle 52 may be, for example, (1) pure water, (2) air, (3) a gas-liquid mixture of pure water, which may contain microbubbles or nanobubbles, and air, (4) acid cleaning liquid, e.g., a mixture of (i) sulfuric acid, hydrochloric acid, or hydrofluoric acid and (ii) hydrogen peroxide water, or (5) alkaline cleaning liquid, e.g., a mixture of an aqueous solution of ammonium hydroxide and hydrogen peroxide water.

The nozzle 52 is controlled to eject liquid or gas or a mixture thereof by a first solenoid-operated valve, not depicted, connected between the nozzle 52 and the liquid supply device 56 and a second solenoid-operated valve, not depicted, connected between the nozzle 52 and the air supply device 58. The fluid passages in the nozzle 52 include a liquid passage and a gas passage that are joined together in the vicinity of the ejection port of the nozzle 52. In order for the nozzle 52 to eject a gas-liquid mixture, the first solenoid-operated valve and the second solenoid-operated valve are opened to supply the liquid from the liquid supply device 56 and the gas from the air supply device 58 to the nozzle 52, which mixes the liquid and the gas in the vicinity of the ejection port thereof.

A microscope camera unit 60 is disposed above the spinner table 32. The microscope camera unit 60 captures an image of the clean-up target 23 that will be used to indicate a region of the clean-up target 23 to be cleaned or dried in the local region cleaning step S30 and the local region drying step S50 to be described later. The microscope camera unit 60 can be moved along the Z-axis and at least either the X-axis or the Y-axis by actuators, not depicted, that are controlled by the controller 62.

The cutting apparatus 2 illustrated in FIG. 2 further includes outer panels, not depicted, mounted on the foundation base 4 in covering relation to upper and side areas of the support structures 4*b* and 4*c* and other components of the cutting apparatus 2. One of the outer panels supports thereon a touch panel, not depicted, that functions as a display unit for displaying images captured by the microscope camera units 28 and 60, graphical user interfaces (GUIs), and processing conditions, for example, and also as an input unit for entering instructions from the operator of the cutting apparatus 2.

The cassette elevator 6*a*, the chuck table 14, the X-axis moving mechanism, the first delivery unit 16*a*, the second delivery unit 16*b*, the pair of cutting unit moving mechanisms, the pair of cutting units 18, the microscope camera units 28, the spinner cleaning apparatus 30, i.e., the spinner table 32, the driver circuit 38, the cleaning unit 54, the swinging mechanism 48, and the microscope camera unit 60, the liquid supply device 56, the air supply device 58, the touch panel, and the like are controlled in operation by the controller 62.

The controller 62 includes a computer having a processor, i.e., a processing device, 62*a* such as a central processing unit (CPU), and a memory, i.e., a storage device, 62*b*, for example. The memory 62*b* includes a main storage unit such as a dynamic random access memory (DRAM) and an auxiliary storage unit such as a flash memory, a hard disk drive, or a solid-state drive. The auxiliary storage unit stores software including a predetermined program. The processor 62*a* operates by running the software stored in the auxiliary storage unit to perform the functions of the controller 62.

A method of cleaning the clean-up target 23 with use of the spinner cleaning apparatus 30 will be described below with reference to FIGS. 5 through 11B in accordance with the flowchart of FIG. 1. The frame unit 21 including the clean-up target 23, i.e., the workpiece 11 with the cut grooves 13*a* defined therein, is delivered from the chuck table 14 to the spinner table 32 by the second delivery unit 16*b*.

Figure 5:
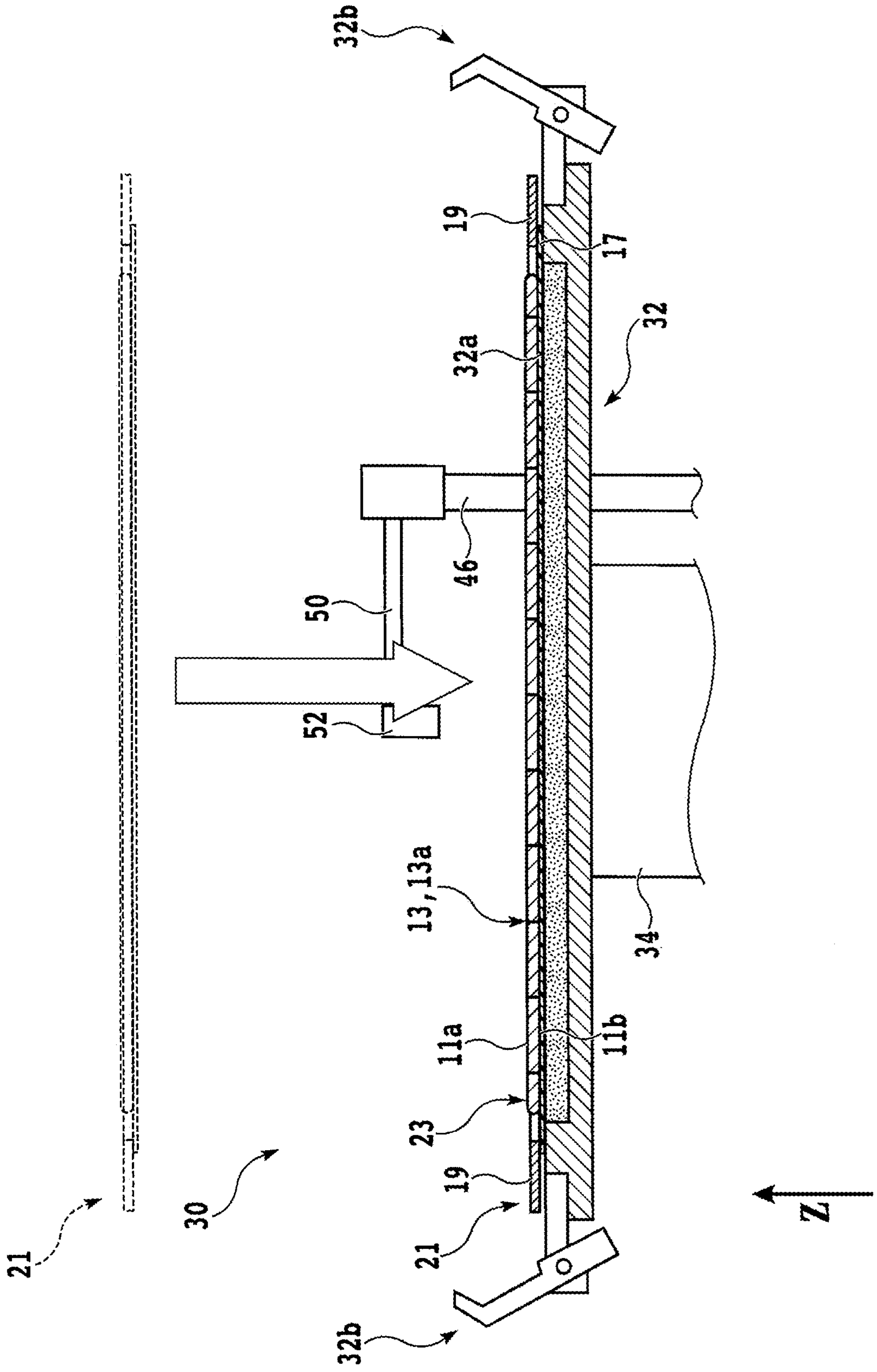
FIG. 5 is an enlarged side elevational view, partly in cross section, of a holding step of the clean-up target cleaning method according to the first embodiment.

FIG. 5 illustrates in enlarged side elevation, partly in cross section, the holding step S10 in which the frame unit 21 delivered to the spinner table 32 is held under suction on the holding surface 32*a*. In the holding step S10, the clean-up target 23 is held under suction on the holding surface 32*a* with the dicing tape 17 interposed therebetween. After the holding step S10, the overall region cleaning step S20 is carried out to clean the overall region of the face side, i.e., the upper surface, of the clean-up target 23 by way of spin cleaning.

Figure 6A:
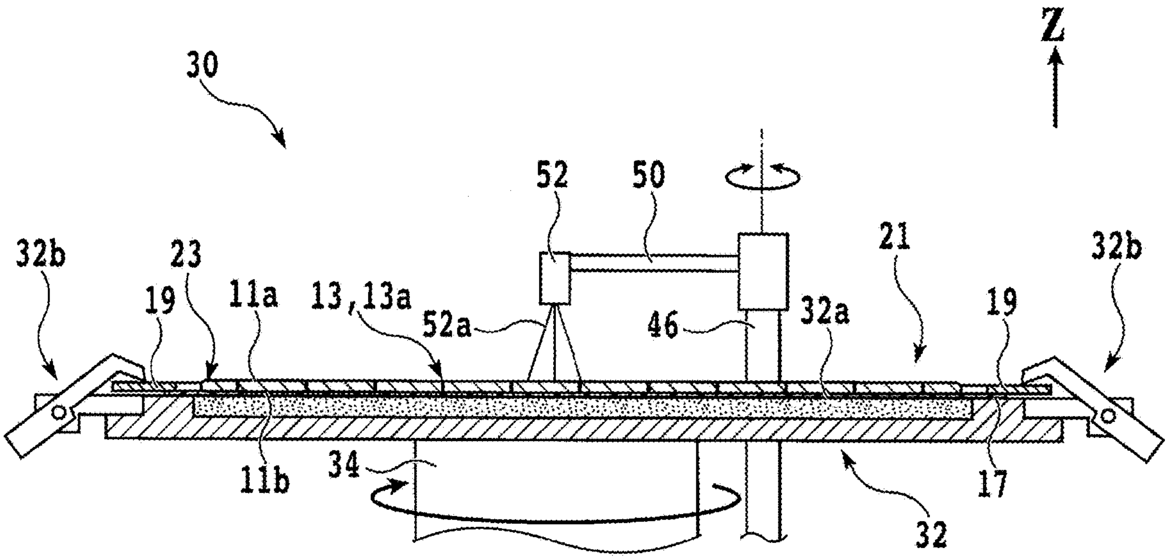
FIG. 6A is an enlarged side elevational view, partly in cross section, illustrating an overall region cleaning step of the clean-up target cleaning method according to the first embodiment.
Figure 6B:
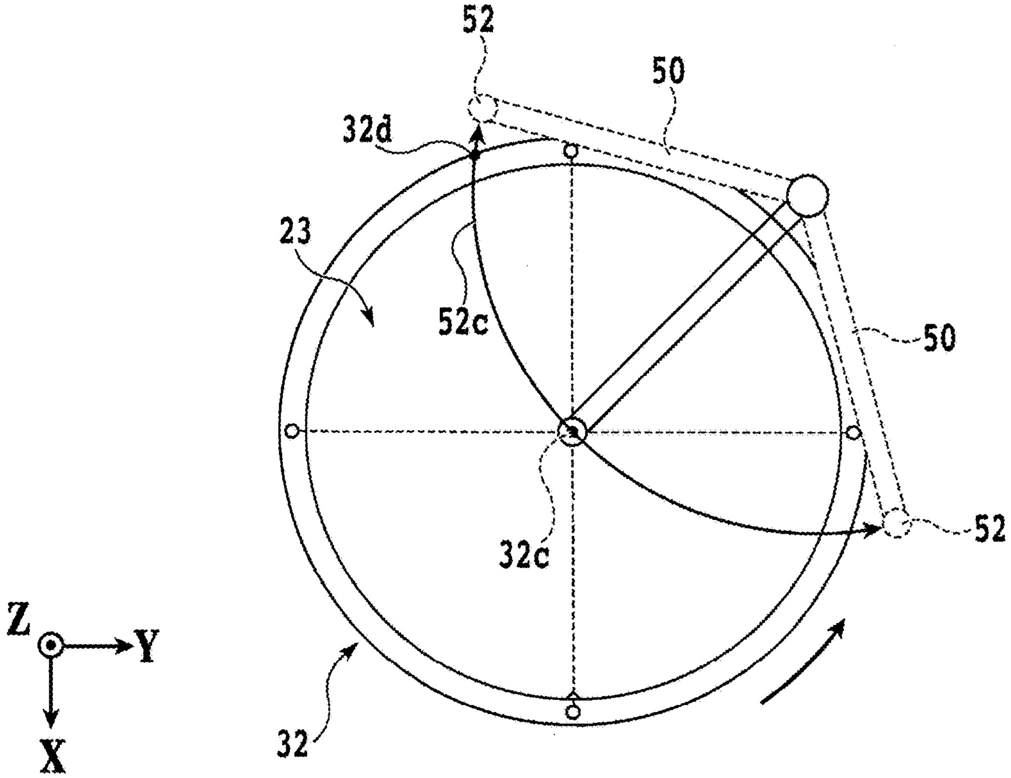
FIG. 6B is a plan view illustrating the overall region cleaning step.

FIG. 6A illustrates the overall region cleaning step S20 in enlarged side elevation, partly in cross section. FIG. 6B illustrates in plan the overall region cleaning step S20. In the overall region cleaning step S20, the electric motor 36 is energized to rotate the spinner table 32 about its vertical central axis at a rotational speed indicated by the controller 62. At the same time, the nozzle 52 ejects pure water (second fluid) 52*a* to the clean-up target 23 while the swinging mechanism 48 is swinging the nozzle 52 back and forth along an arcuate path 52*c* that extends over the clean-up target 23 from an outer circumferential edge 32*d* of the spinner table 32 to the center 32*c* thereof, moving the pure water 52*a* ejected from the nozzle 52 relatively to the clean-up target 23 thereby to clean the overall region of the face side 11*a* of the clean-up target 23.

An example of cleaning conditions in the overall region cleaning step S20 is illustrated below.

Flow rate of pure water: 1 L/min to 2 L/min
Speed at which nozzle moves: 20 mm/s
Rotational speed of spinner table:
100 rpm to 1000 rpm (e.g., 800 rpm)
Cleaning time: 30 s to 90 s (e.g., 60 s)

After the overall region cleaning step S20, the local region cleaning step S30 is carried out. According to the present embodiment, the overall region cleaning step S20 is carried out prior to the local region cleaning step S30, or the local region cleaning step S30 is carried out after the overall region cleaning step S20. In the local region cleaning step S30, according to the present embodiment, the pure water (first fluid) 52*a* supplied from the nozzle 52 cleans a local region of the clean-up target 23.

FIGS. 7A through 9B illustrate the local region cleaning step S30 in plan. The pattern in which the devices 15 are laid out as illustrated in FIGS. 7A through 9B is different from the pattern in which the devices 15 are laid out as illustrated in FIG. 3. However, the layout patterns are illustrated by way of example only, and either of them have no direct bearing on the essential features of the local region cleaning step S30.

In the local region cleaning step S30, the turning of the spinner table 32 about the rotational shaft 34 through a rotational angle indicated by the controller 62 and the angular movement of the nozzle 52 with respect to the rotational shaft 34 are combined with each other to clean a local region, rather than the overall region, of the clean-up target 23. Specifically, while the nozzle 52 is ejecting the pure water 52*a*, the nozzle 52 and the clean-up target 23 are moved relatively to each other to clean the clean-up target 23 with the pure water 52*a* along one of the cut grooves 13*a*, i.e., one of the projected dicing lines 13, which represents a straight clean-up region as viewed in plan, i.e., an XY plane.

As described above, the cut grooves 13*a* are formed in the clean-up target 23 along the respective projected dicing lines 13. In the local region cleaning step S30, one of the cut grooves 13*a* is cleaned all the way from a point PA positioned at a longitudinal end thereof to another point PD positioned at an opposite longitudinal end thereof. Before starting to carry out the local region cleaning step S30, the controller 62 has been recognizing the orientation, denoted by 25, of the clean-up target 23 on the holding surface 32*a*. Specifically, the controller 62 has been recognizing the initial orientation 25 of the clean-up target 23 and also the angle through which the spinner table 32 has been turned at the time the clean-up target 23 is delivered to the spinner table 32 by the second delivery unit 16*b* upon the start of the local region cleaning step S30.

As illustrated in FIGS. 7A through 9B, the clean-up target 23 has a notch defined in the outer circumferential edge portion thereof as indicating the crystal orientation of the material of the clean-up target 23. The orientation 25 of the clean-up target 23 refers to an orientation toward the diametric center of the clean-up target 23 from the position of an innermost edge of the notch, i.e., the position closest to the center of the clean-up target 23 that is aligned with the diametrical center of the workpiece 11. The controller 62 has been recognizing the initial position of the nozzle 52 in local region cleaning step S30 and the distance that the nozzle 52 has been moved by the swinging mechanism 48 in the local region cleaning step S30. Consequently, the controller 62 has also been recognizing at all times the position of the nozzle 52 in the XY plane with respect to the center 32*c* of the holding surface 32*a* that serves as the origin of the XY plane.

In the local region cleaning step S30, first, the operator indicates a cut groove 13*a* to be cleaned, using the image captured by the microscope camera unit 60 and displayed on the touch panel. The operator may indicate one cut groove 13*a* or a plurality of cut grooves 13*a* or all of the cut grooves 13*a*. Using the image captured by the microscope camera unit 60 is advantageous in that the operator is able to visually check a local region of the clean-up target 23 to be cleaned.

A process of cleaning one cut groove 13*a* represented by a broken line will be described by way of example below with reference to FIGS. 7A through 9B. In the cleaning process, the nozzle 52 is swung counterclockwise or clockwise at a predetermined speed, and the angle through which the spinner table 32 is turned clockwise is adjusted in order to enable the swinging nozzle 52 to move straight from the point PA to the point PD.

An example of cleaning conditions in the local region cleaning step S30 is illustrated below.

Flow rate of pure water: 1 L/min to 2 L/min

Speed at which nozzle moves: 15 mm/s

Angle through which spinner table is turned:

adjusted appropriately depending on position of nozzle

The movements of the nozzle 52 and the spinner table 32 described above are given by way of example only. The speed at which the nozzle 52 moves may not be constant, and the nozzle 52 may move not only in one direction, but also may move in an opposite direction. The direction in which the spinner table 32 is turned is not limited to any particular directions.

The controller 62 first indicates the angle through which the spinner table 32 is to be turned in order to position the nozzle 52 at the point PA on the projected dicing line 13 at the outer circumferential edge of the clean-up target 23 on the basis of the initial orientation 25 of the clean-up target 23 in the XY plane and the initial position of the nozzle 52 with respect to the holding surface 32*a* in the XY plane.

Figure 7A:
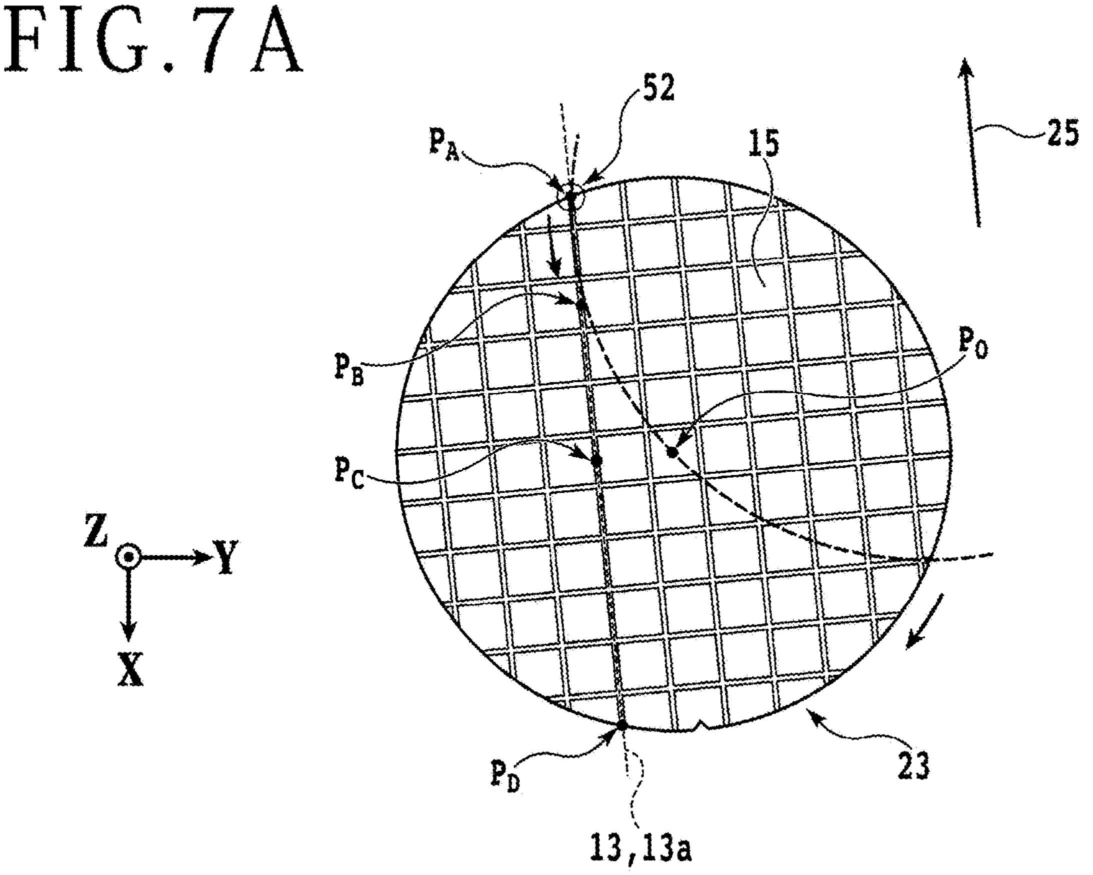
FIG. 7A is a plan view of the clean-up target with a nozzle located at a point PA.

FIG. 7A illustrates in plan the clean-up target 23 at the time the nozzle 52 is positioned at the point PA. In FIGS. 7A through 9B, the spinner table 32 is omitted from illustration, and the clean-up target 23 on the holding surface 32*a* of the spinner table 32 is illustrated. The center, denoted by $P_O$, of the holding surface 32*a* is aligned with the diametric center of the clean-up target 23. In FIGS. 7A through 9B, moreover, the nozzle 52 is simply depicted as a circle, and the track along which the nozzle 52 swings and the projected dicing line 13 and the cut groove 13*a* where the pure water 52*a* lands on the clean-up target 23 are indicated by broken lines. Although the cut grooves 13*a* are formed in the clean-up target 23 along the respective projected dicing lines 13, the cut grooves 13*a* are omitted from illustration for easier visual perception.

After having started cleaning the clean-up target 23 at the point PA, the nozzle 52 is turned counterclockwise relatively to the position $P_O$, and the spinner table 32 is turned clockwise around the rotational shaft 34 through an indicated angle ranging from 0 degree to 10 degrees, for example, per unit time. The angle through which the spinner table 32 is turned is indicated in each relatively short unit time of 100 ms or 50 ms, for example, so that the pure water 52*a* will enter the cut groove 13*a* as accurately as possible. The angle through which the spinner table 32 is turned may be different or may remain unchanged in each unit time.

Figure 7B:
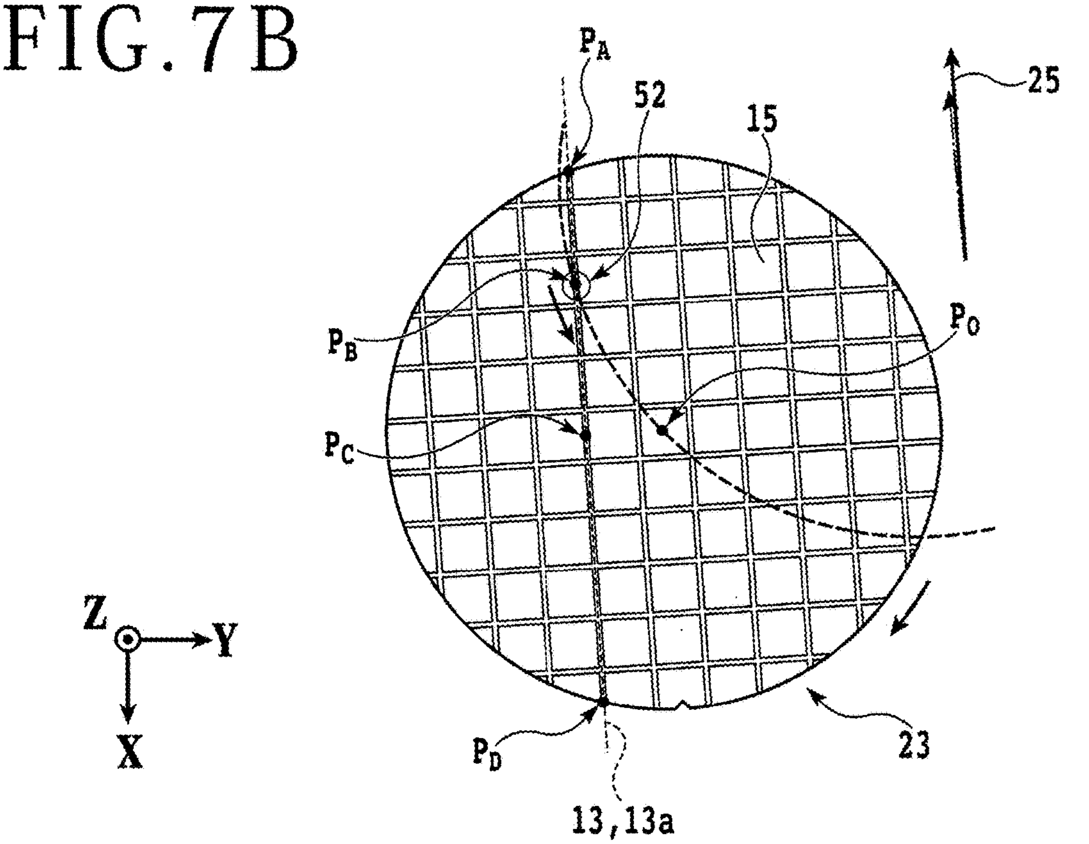
FIG. 7B is a plan view of the clean-up target with the nozzle located at a point PB.

FIG. 7B illustrates in plan the clean-up target 23 at the time the nozzle 52 is positioned at a point PB. The point PB is positioned between the point PA and a point Pc that is positioned intermediate between the point PA and the point PD. The orientation 25 of the clean-up target 23 in FIG. 7B is indicated by the solid line, whereas the orientation 25 of the clean-up target 23 in FIG. 7A is indicated by the dot-and-dash line for comparison. As illustrated in FIG. 7B, after the nozzle 52 has reached the point PB, the nozzle 52 is continuously turned counterclockwise relatively to the position $P_O$, and the spinner table 32 is continuously turned clockwise around the rotational shaft 34 through an indicated angle ranging from 0 degree to 30 degrees, for example, per unit time.

Figure 8A:
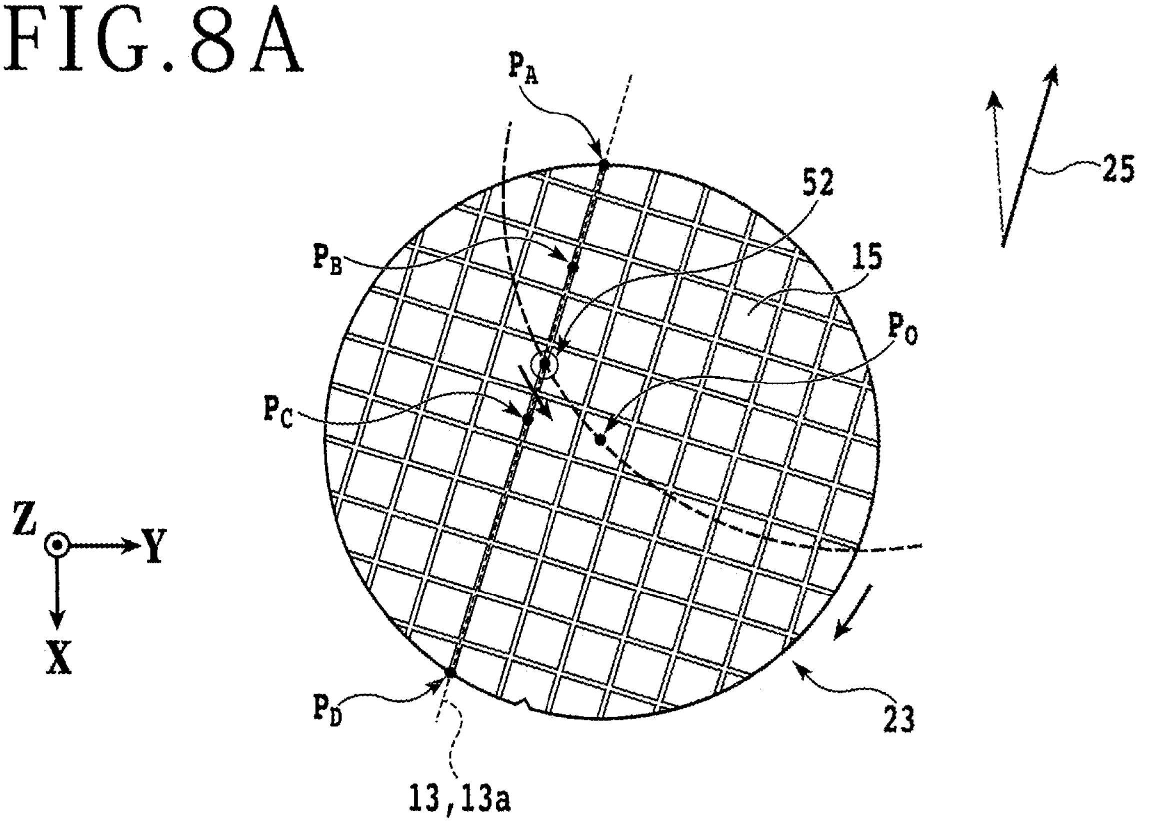
FIG. 8A is a plan view of the clean-up target with the nozzle located between the point PB and a point Pc.

FIG. 8A illustrates in plan the clean-up target 23 at the time the nozzle 52 is positioned between the point PB and the point $P_C$. The orientation 25 of the clean-up target 23 in FIG. 8A is indicated by the solid line, whereas the orientation 25 of the clean-up target 23 in FIG. 7B is indicated by the dot-and-dash line for comparison. When the nozzle 52 has reached a predetermined position between the point PB and the point Pc, the nozzle 52 finds itself in a critical point where it could not clean the remaining uncleaned portion of the cut groove 13*a* if the nozzle 52 were still turned counterclockwise.

To avoid the shortcoming, after the nozzle 52 has reached the predetermined position between the point PB and the point Pc, the nozzle 52 is turned clockwise, rather than counterclockwise, relatively to the position $P_O$, and the spinner table 32 is turned clockwise around the rotational shaft 34 through an indicated angle ranging from 0 degree to 90 degrees, for example, per unit time.

Figure 8B:
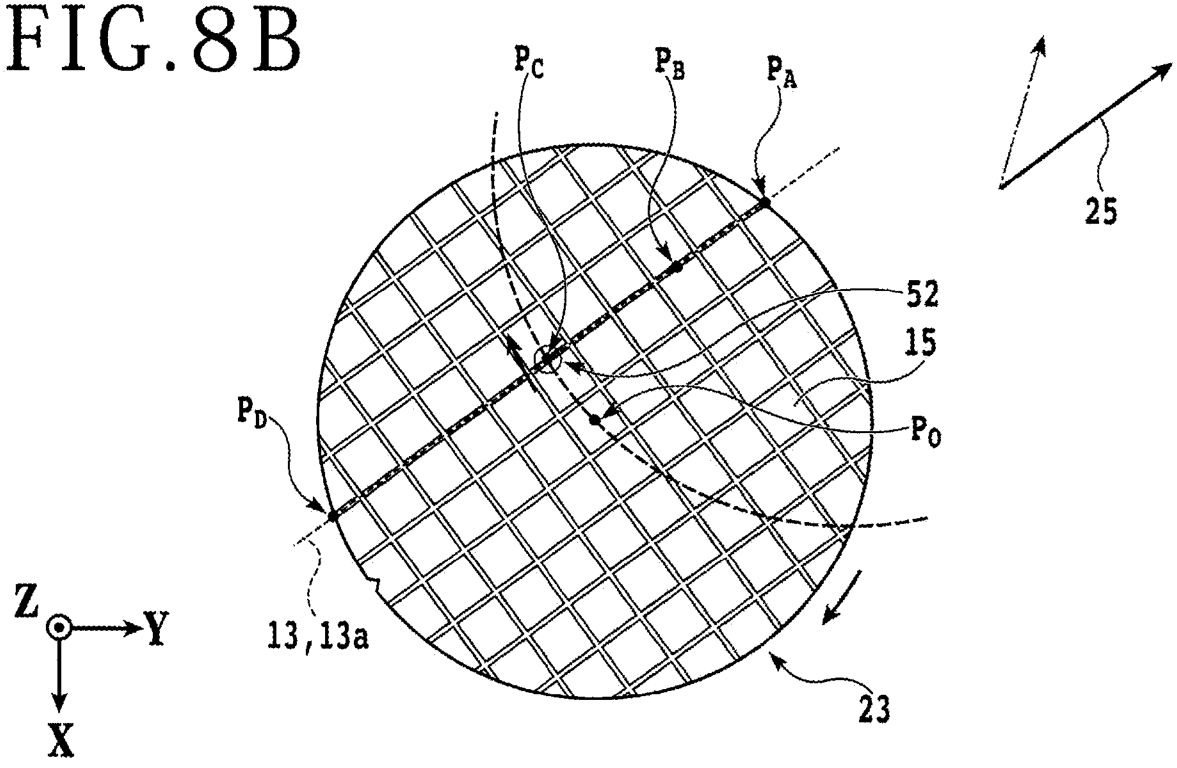
FIG. 8B is a plan view of the clean-up target with the nozzle located at the point Pc.

FIG. 8B illustrates in plan the clean-up target 23 at the time the nozzle 52 is positioned at the point Pc. The orientation 25 of the clean-up target 23 in FIG. 8B is indicated by the solid line, whereas the orientation 25 of the clean-up target 23 in FIG. 8A is indicated by the dot-and-dash line for comparison.

Figure 9A:
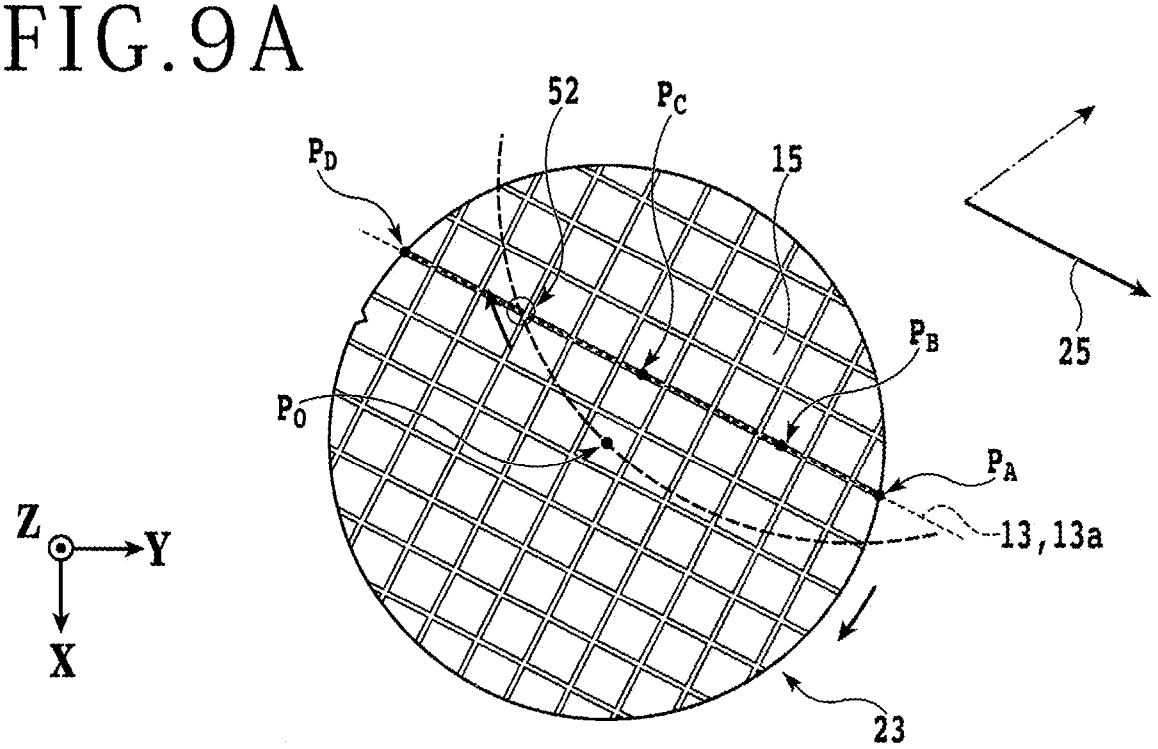
FIG. 9A is a plan view of the clean-up target with the nozzle located between the point Pc and a point PD.

FIG. 9A illustrates in plan the clean-up target 23 at the time the nozzle 52 is positioned between the point Pc and the point PD. The orientation 25 of the clean-up target 23 in FIG. 9A is indicated by the solid line, whereas the orientation 25 of the clean-up target 23 in FIG. 8B is indicated by the dot-and-dash line for comparison.

Figure 9B:
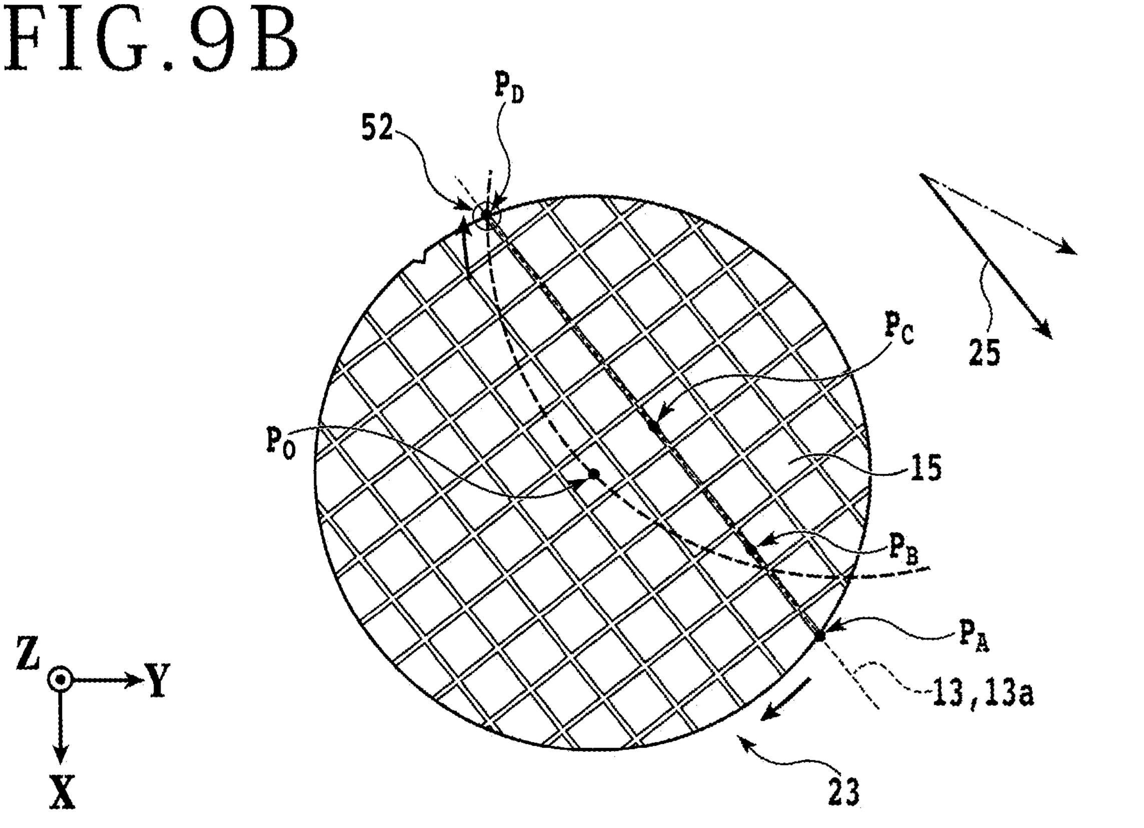
FIG. 9B is a plan view of the clean-up target with the nozzle located at the point PD.

FIG. 9B illustrates in plan the clean-up target 23 at the time the nozzle 52 is positioned at the point PD. The orientation 25 of the clean-up target 23 in FIG. 9B is indicated by the solid line, whereas the orientation 25 of the clean-up target 23 in FIG. 9A is indicated by the dot-and-dash line for comparison.

According to the present embodiment, inasmuch as the local region cleaning step S30 is also carried out to clean only one cut groove 13*a* as a local region, the amount of foreign matter or the number of particles of foreign matter such as swarf remaining on the bottom and side surfaces of the cut groove 13*a* can be reduced compared with the case where only the overall region cleaning step S20 is carried out. In other words, a high-quality cleaning process can be performed on the cut groove 13*a*. The relative movements of the nozzle 52 and the spinner table 32 as described above can be realized by the controller 62 when the processor 62*a* executes the predetermined program stored in the auxiliary storage unit of the memory 62*b*.

Figure 10:
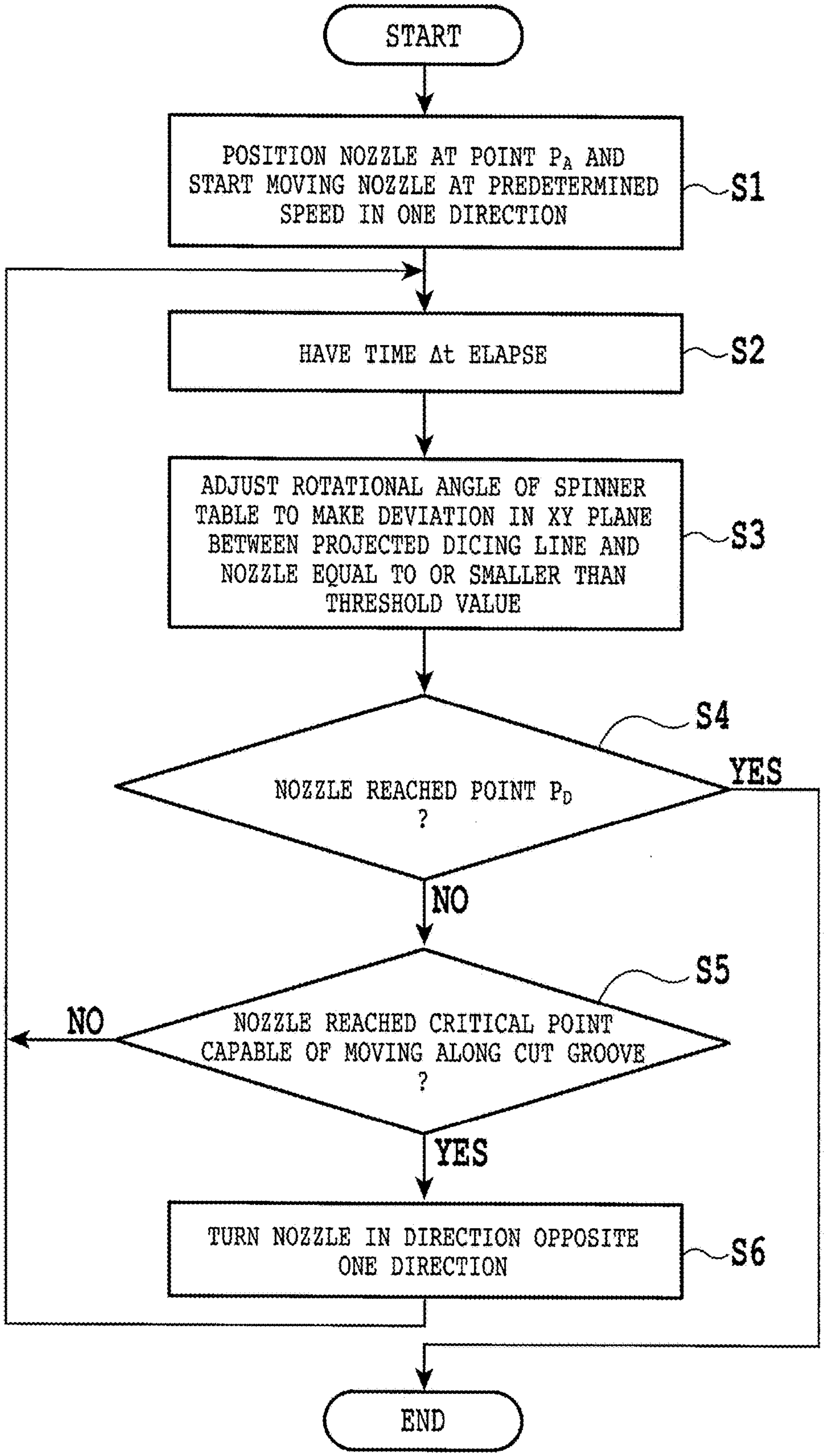
FIG. 10 is a flowchart of a program executed by a processor.

FIG. 10 is a flowchart of the predetermined program executed by the processor 62*a*. Time Δt in step S2 illustrated in FIG. 10 represents the relatively short unit time of 100 ms or 50 ms, for example, referred to above. A threshold value for a deviation in the XY plane between the projected dicing line 13 and the nozzle 52 in step S3 is set to a predetermined value of 50 μm or 100 μm, for example. A critical point in step S4 refers to the predetermined position between the point PB and the point Pc.

In the cleaning process described above with reference to FIGS. 7A through 9B, one cut groove 13*a* is cleaned. However, a plurality of cut grooves 13*a* may similarly be cleaned. Moreover, at the position where the workpiece 11 starts to be cut, a relatively large amount of foreign matter tends to remain in the cut groove 13*a*. In the local region cleaning step S30, therefore, at least one end of the longitudinal ends of the projected dicing line 13 along which the cut groove 13*a* is formed may be cleaned intensively in the vicinity of the point PA or the point PD of the cut groove 13*a*.

For example, while the nozzle 52 and the spinner table 32 are being held at rest for a predetermined period of time, the nozzle 52 ejects the pure water 52*a* to the point PA at one longitudinal end of the corresponding projected dicing line 13. In this manner, a high-quality cleaning process can be performed on the cut groove 13*a* at the position where the clean-up target 23 starts to be cleaned during the same cleaning time, compared with the case where the cut groove 13*a* is cleaned uniformly from the point PA to the point PD with the pure water 52*a* supplied at a predetermined flow rate. A plurality of cut grooves 13*a* may similarly be cleaned intensively at one end of the longitudinal ends thereof where the clean-up target 23 starts to be cleaned.

In the local region cleaning step S30, after one end of the cut groove 13*a* has been cleaned intensively, the nozzle 52 may be moved from the point PA to the point PD to clean the cut groove 13*a* throughout its entire length. After the cut groove 13*a* has been cleaned as a local region, other cut grooves 13*a* are similarly cleaned.

According to the present embodiment, the orientation of the clean-up target 23 may be adjusted with the images captured by using the microscope camera units 60. However, after the chuck table 14 has been turned to adjust the orientation of the clean-up target 23, the spinner cleaning apparatus 30 may move the spinner table 32 and the nozzle 52 so as to move the point where the pure water 52*a* lands on the clean-up target 23 substantially parallel to those projected dicing lines 13 that extend along a predetermined direction. In this case, during a certain period of time in the local region cleaning step S30, the point where the pure water 52*a* lands on the clean-up target 23 may be moved to traverse the devices 15, but not directly above the cut grooves 13*a*. After the local region cleaning step S30 has been finished, control goes to the overall region drying step S40.

Figure 11A:
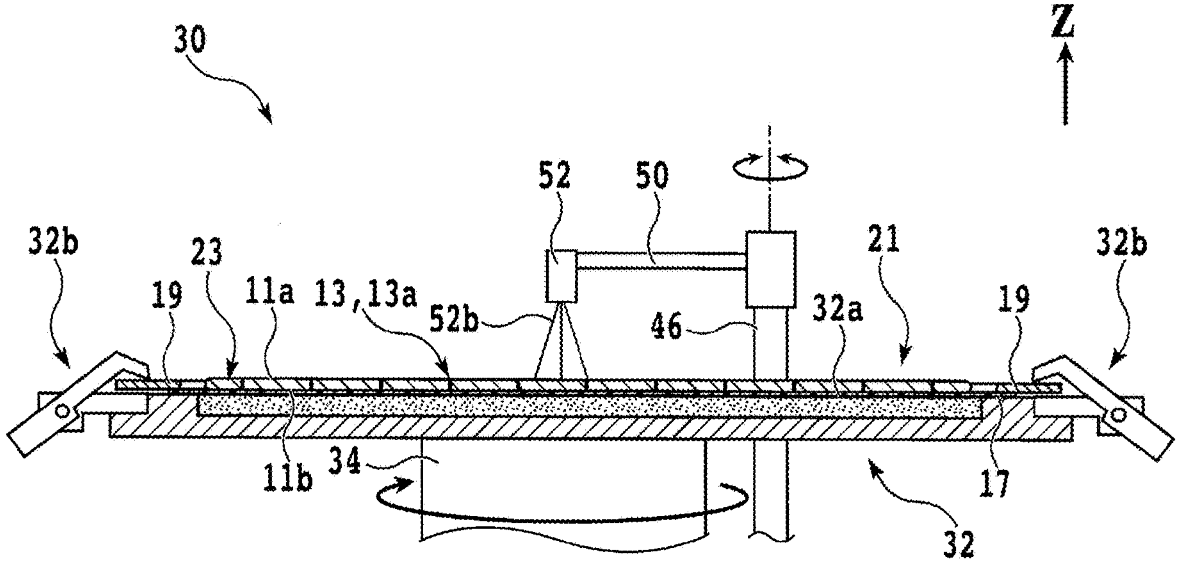
FIG. 11A is an enlarged side elevational view, partly in cross section, illustrating an overall region drying step of the clean-up target cleaning method according to the first embodiment.

FIG. 11A illustrates the overall region drying step S40 in enlarged side elevation, partly in cross section. In the overall region drying step S40, while the spinner table 32 is being rotated about the rotational shaft 34 at an indicated rotational speed, the nozzle 52 ejects air 52*b* to the clean-up target 23 and the nozzle 52 and hence the air 52*b* ejected therefrom are moved relatively to the spinner table 32 along an arcuate path 52*c* that extends over the clean-up target 23 from the outer circumferential edge 32*d* of the spinner table 32 to the center 32*c* thereof. In this fashion, the face side 11*a* of the clean-up target 23 is entirely dried. An example of drying conditions in the overall region drying step S40 is illustrated below.

Flow rate of air: 200 mL/min to 300 mL/min
Pressure of supplied air: 0.3 MPa
Speed at which nozzle moves: 20 mm/s
Rotational speed of spinner table: 1500 rpm to 3000 rpm (e.g., 2000 rpm)
Drying time: 30 s to 90 s (e.g., 60 s)

Figure 11B:
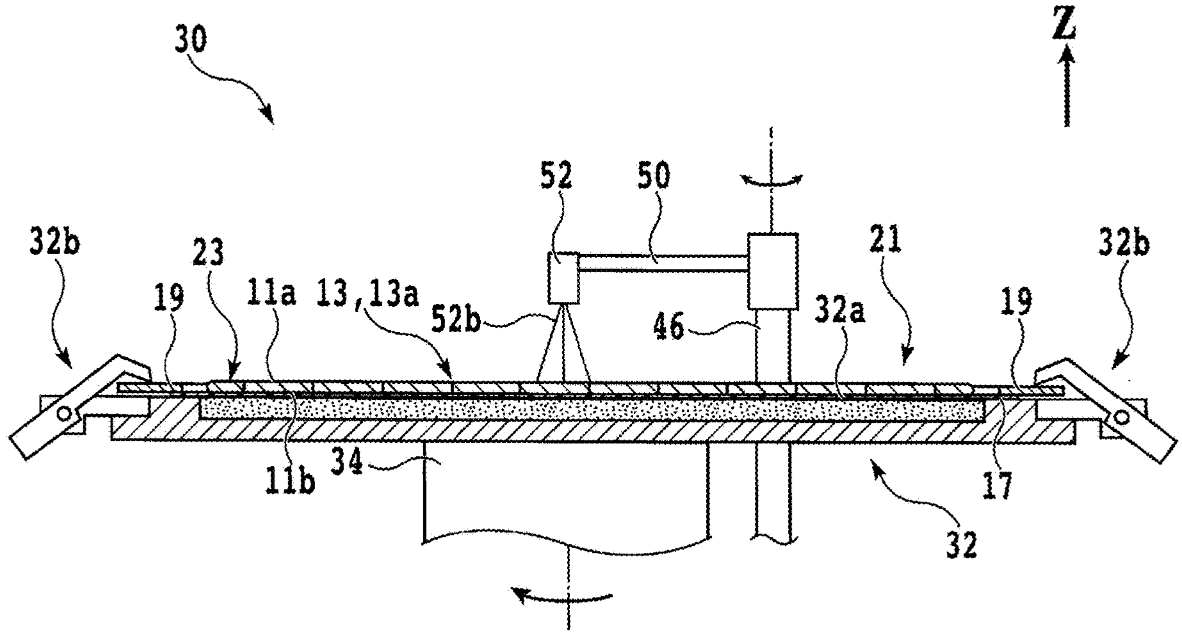
FIG. 11B is an enlarged side elevational view, partly in cross section, illustrating a local region drying step of the clean-up target cleaning method according to the first embodiment.

The overall region drying step S40 is followed by the local region drying step S50. FIG. 11B illustrates the local region drying step S50 in enlarged side elevation, partly in cross section. In the local region drying step S50, the air 52*b*, which is fluid different from the pure water used in the local region cleaning step S30, is applied to dry at least the cut groove 13*a* on which the local region cleaning step S30 has been carried out, thereby drying the cut grooves 13*a* as a local region.

In the local region drying step S50, as with the local region cleaning step S30, the turning of the spinner table 32 about the rotational shaft 34 through a rotational angle indicated by the controller 62 and the angular movement of the nozzle 52 with respect to the rotational shaft 34 are combined with each other to move the nozzle 52 along the straight cut groove 13*a*. Specifically, while the nozzle 52 is ejecting the air 52*b*, the nozzle 52 and the clean-up target 23 are moved relatively to each other to dry the cut groove 13*a* in the clean-up target 23 with the air 52*b* along the cut groove 13*a*, i.e., the projected dicing line, as a local region.

In the local region drying step S50, water droplets remaining on the bottom and the side surfaces of the cut groove 13*a* may be forced upwardly and components such as silicon swarf contained in the water droplets may be dried into powdery particles and fixed to the face side 11*a*. Consequently, after the local region drying step S50, an overall region drying step may be carried out again to remove water droplets together with those powdery particles.

In other embodiments to be described later, an overall region drying step may be added after the local region drying step S50. The overall region drying step carried out again after the local region drying step S50 is effective to prevent powdery particles from remaining fixed to the face side 11*a*, allowing a high-quality cleaning process to be performed on the face side 11*a*, compared with the case where an overall region drying step is not carried out again.

According to the present embodiment, the nozzle 52 is turned or swung initially counterclockwise and then clockwise about the rotational shaft 34, and the spinner table 32 is turned constantly counterclockwise. Alternatively, the nozzle 52 may be turned or swung in one direction only about the rotational shaft 34, and the spinner table 32 may be turned switchingly counterclockwise and clockwise as needed. A clean-up target cleaning method according to two modifications will be described below with reference to FIGS. 12A and 12B.

First Modification

Figure 12A:
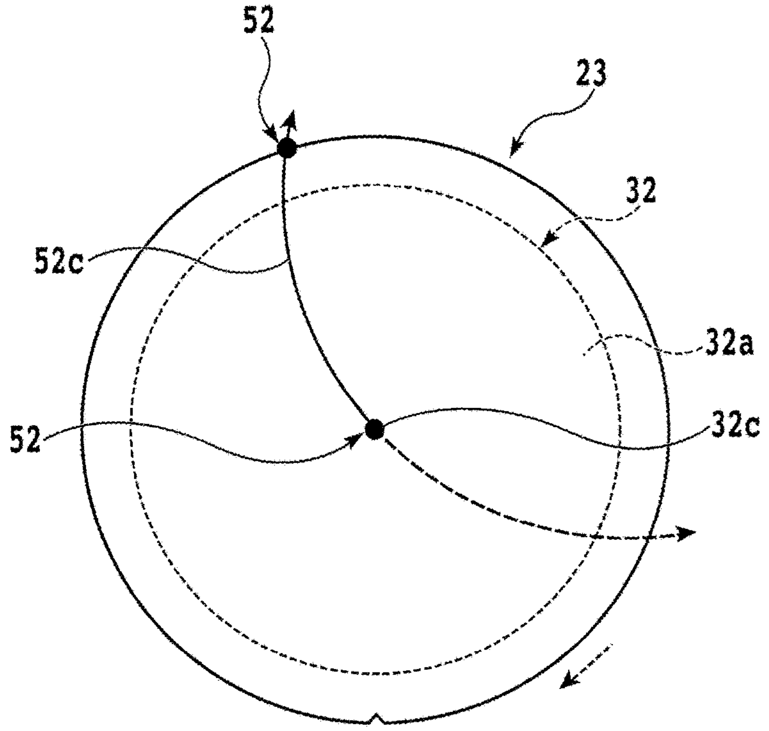
FIG. 12A is a plan view of a clean-up target according to a first modification.

FIG. 12A illustrates a clean-up target 23 according to the first modification. According to the first modification, the clean-up target 23 is larger in diameter than the holding surface 32*a* of the spinner table 32 and hence has an outer circumferential portion protruding radially outwardly beyond the holding surface 32*a*. In a cleaning process, the nozzle 52 relatively moves with respect to the rotational shaft 34 along a path 52*c* including an arcuate section indicated by the solid line from the outer circumferential edge of the clean-up target 23 held on the holding surface 32*a* to the center 32*c* of the holding surface 32*a* and an arcuate section indicate by the broken line.

Second Modification

Figure 12B:
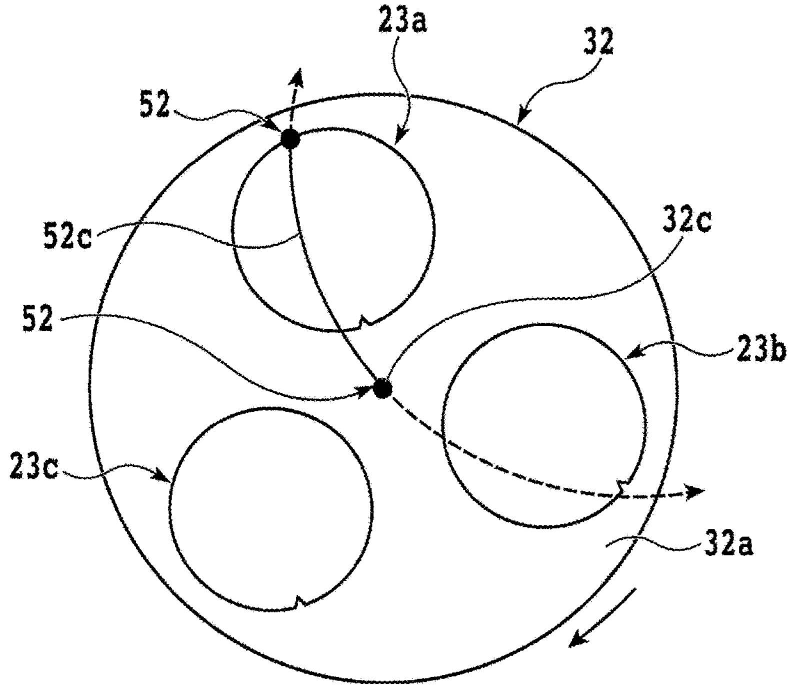
FIG. 12B is a plan view of a plurality of clean-up targets according to a second modification.

FIG. 12B illustrates in plan a plurality of clean-up targets 23*a*, 23*b*, and 23*c* according to a second modification. According to the second modification, each of the clean-up targets 23*a*, 23*b*, and 23*c* is smaller in diameter than the holding surface 32*a*, and held under suction on the holding surface 32*a*. In a cleaning process, the nozzle 52 relatively moves with respect to the rotational shaft 34 along a path 52*c* including an arcuate section indicated by the solid line from a point on the outer circumferential edge of the clean-up target 23*a* that is closest to the outer circumferential edge 32*d* of the spinner table 32 to the center 32*c* of the holding surface 32*a* and an arcuate section indicate by the broken line.

Second Embodiment

Figure 13:
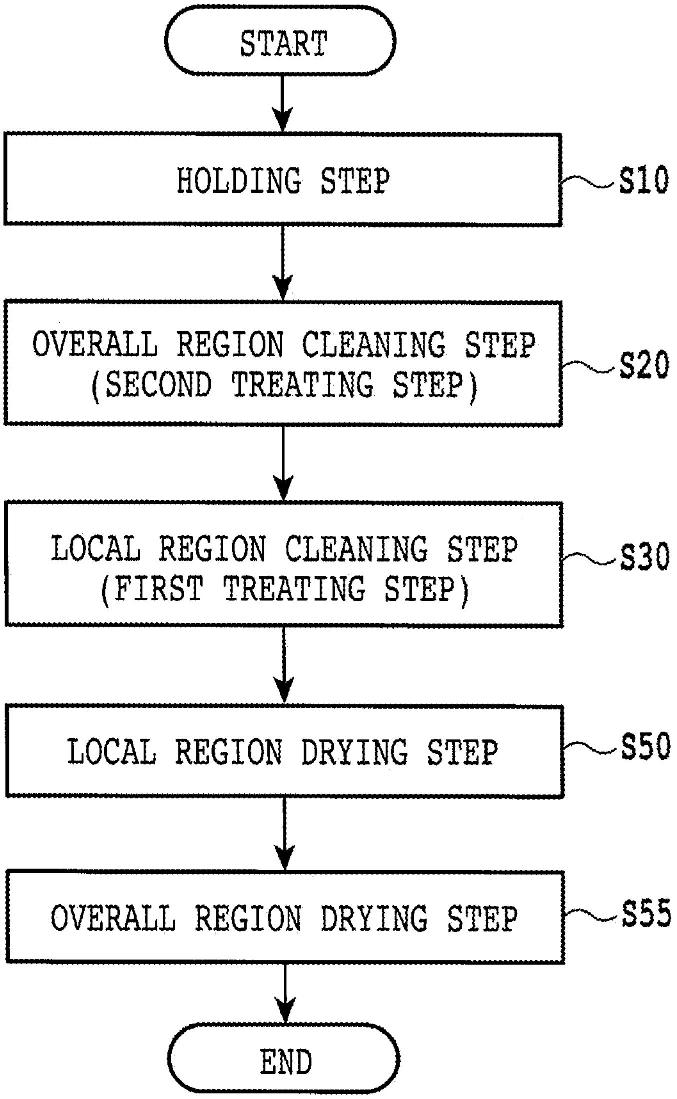
FIG. 13 is a flowchart of a clean-up target cleaning method according to a second embodiment of the present invention.

A clean-up target cleaning method according to a second embodiment of the present invention will be described below with reference to FIG. 13. FIG. 13 is a flowchart of the clean-up target cleaning method according to the second embodiment. According to the second embodiment, the clean-up target cleaning method includes the holding step S10, the overall region cleaning step (second treating step) S20, the local region cleaning step (first treating step) S30, the local region drying step S50, and an overall region drying step S55. The clean-up target cleaning method according to the second embodiment is different from the clean-up target cleaning method according to the first embodiment in that the overall region drying step S55 is carried out after the local region drying step S50. According to the second embodiment, a local region of the clean-up target 23 is cleaned by the pure water 52*a* supplied from the nozzle 52 in the local region cleaning step S30. Moreover, the overall region drying step S55 is carried out after the local region drying step S50 to provide a high-quality cleaning process to be performed on the face side 11*a*.

Third Embodiment

Figure 14A:
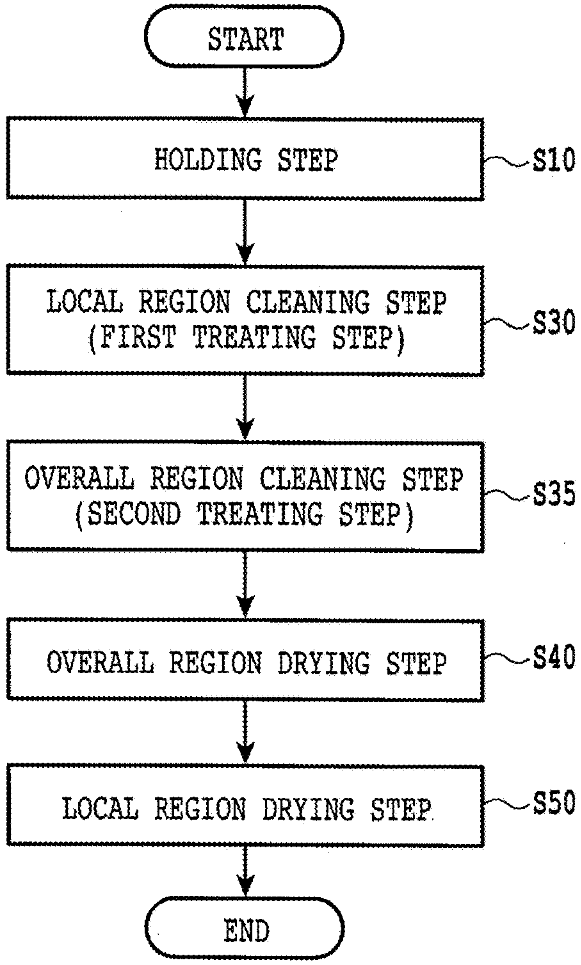
FIG. 14A is a flowchart of a clean-up target cleaning method according to a third embodiment of the present invention.

A clean-up target cleaning method according to a third embodiment of the present invention will be described below with reference to FIG. 14A. FIG. 14A is a flowchart of the clean-up target cleaning method according to the third embodiment. According to the third embodiment, after the holding step S10, the local region cleaning step (first treating step) S30 is carried out and then, an overall region cleaning step (second treating step) S35 is carried out. After the overall region cleaning step S35, the overall region drying step S40 and then, the local region drying step S50 are carried out as with the first embodiment. According to the third embodiment, a local region of the clean-up target 23 is cleaned by the pure water 52*a* supplied from the nozzle 52 in the local region cleaning step S30.

Fourth Embodiment

Figure 14B:
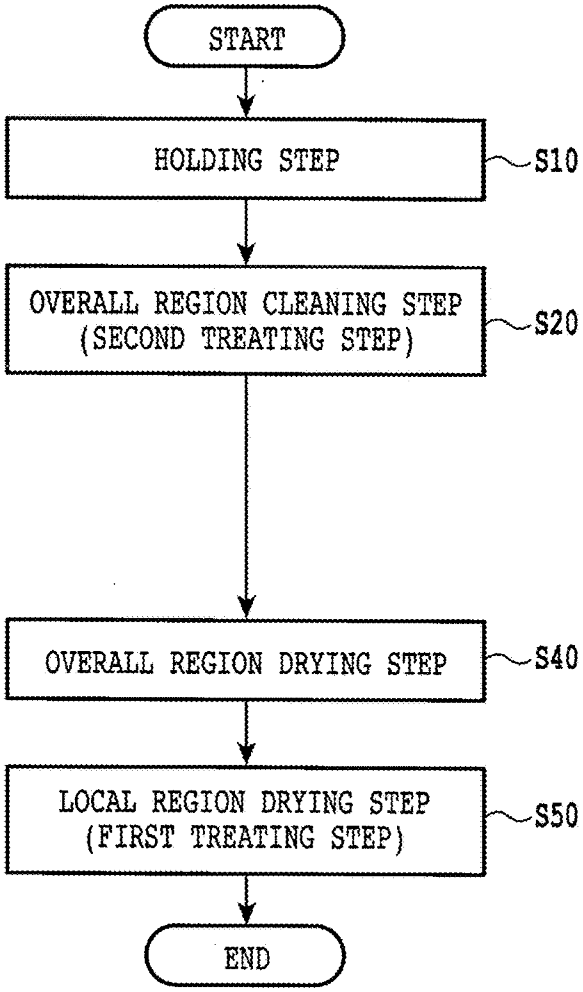
FIG. 14B is a flowchart of a clean-up target cleaning method according to a fourth embodiment of the present invention.

A clean-up target cleaning method according to a fourth embodiment of the present invention will be described below with reference to FIG. 14B. FIG. 14B is a flowchart of the clean-up target cleaning method according to the fourth embodiment. According to the fourth embodiment, after the holding step S10, the overall region cleaning step (second treating step) S20 is carried out with the pure water (second fluid) 52*a*, as with the first embodiment. According to the fourth embodiment, however, the local region cleaning step S30 is not carried out, and the overall region drying step S40 is carried out and then, the local region drying step (first treating step) S50 is carried out with the air (first fluid) 52*b*.

In the local region drying step S50, a local region of the clean-up target 23 is dried by the air 52*b* supplied from the nozzle 52. Therefore, the number of powdery particles remaining in the cut grooves 13*a* is reduced, compared with the case where the cleaning process is finished with only the overall region cleaning step S20 and the overall region drying step S40 after the holding step S10.

Fifth Embodiment

Figure 15A:
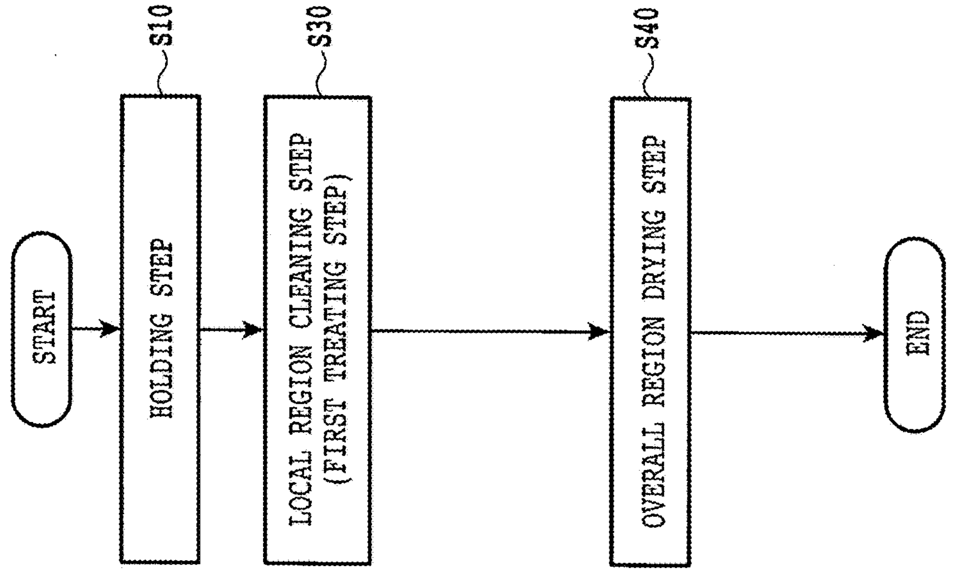
FIG. 15A is a flowchart of a clean-up target cleaning method according to a fifth embodiment of the present invention.

A clean-up target cleaning method according to a fifth embodiment of the present invention will be described below with reference to FIG. 15A. FIG. 15A is a flowchart of the clean-up target cleaning method according to the fifth embodiment. According to the fifth embodiment, after the holding step S10, the local region cleaning step (first treating step) S30 with the pure water (first fluid) 52*a* and the overall region drying step S40 are successively carried out.

Sixth Embodiment

Figure 15B:
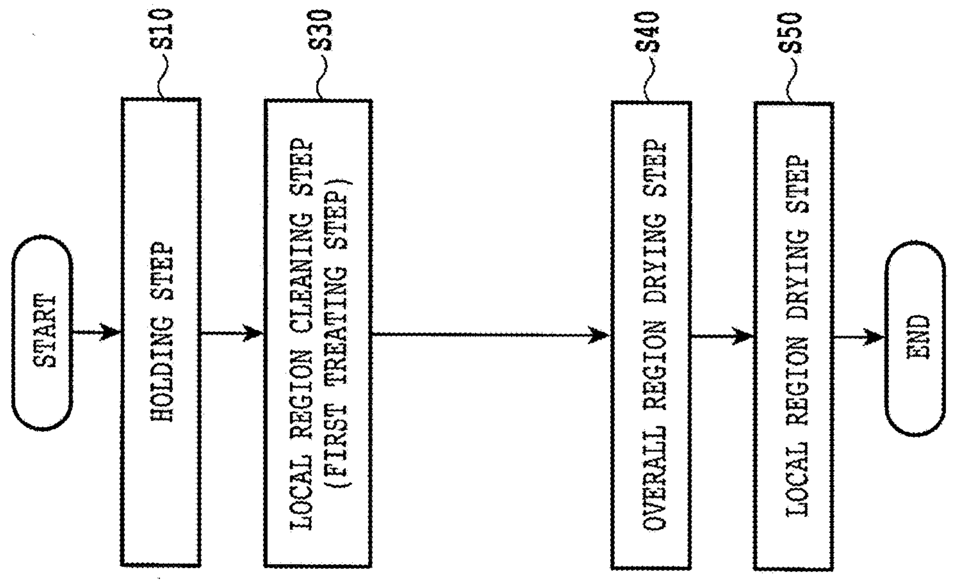
FIG. 15B is a flowchart of a clean-up target cleaning method according to a sixth embodiment of the present invention.

A clean-up target cleaning method according to a sixth embodiment of the present invention will be described below with reference to FIG. 15B. FIG. 15B is a flowchart of the clean-up target cleaning method according to the sixth embodiment. The sixth embodiment is different from the fifth embodiment in that the local region drying step S50 is carried out after the overall region drying step S40.

Seventh Embodiment

Figure 15C:
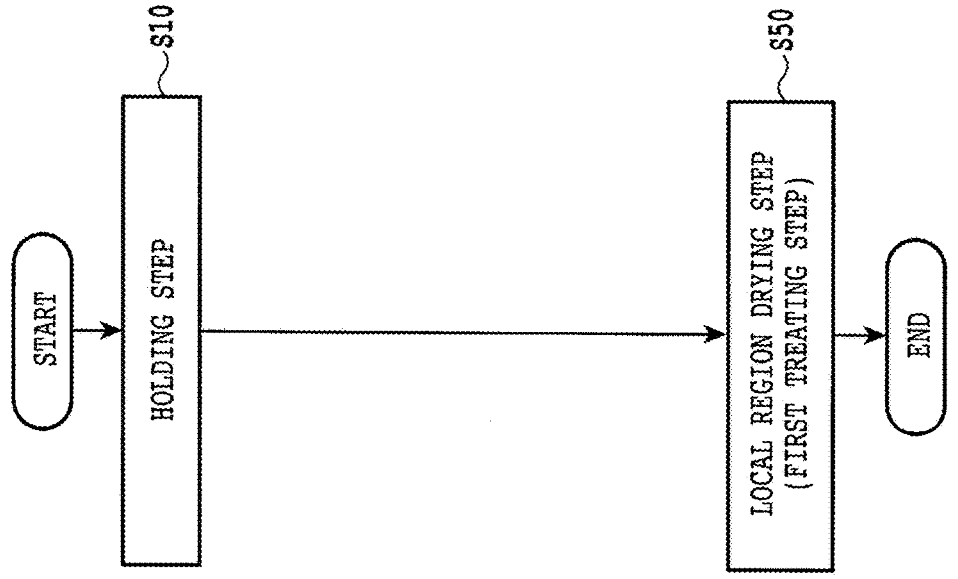
FIG. 15C is a flowchart of a clean-up target cleaning method according to a seventh embodiment of the present invention.

A clean-up target cleaning method according to a seventh embodiment of the present invention will be described below with reference to FIG. 15C. FIG. 15C is a flowchart of the clean-up target cleaning method according to the seventh embodiment. According to the seventh embodiment, only the local region drying step (first treating step) S50 is carried out with the air (first fluid) 52*b* after the holding step S10. According to the fifth through seventh embodiments, though the overall region cleaning step S20 is not carried out, a local region of the clean-up target 23 can be cleaned and/or dried.

According to the above embodiments, the spinner cleaning apparatus 30 has the single nozzle 52 and the nozzle 52 selectively ejects the pure water 52*a* or the air 52*b*. However, the spinner cleaning apparatus 30 may have both the nozzle (first nozzle) 52 and another nozzle (second nozzle) 64 different therefrom.

Figure 16:
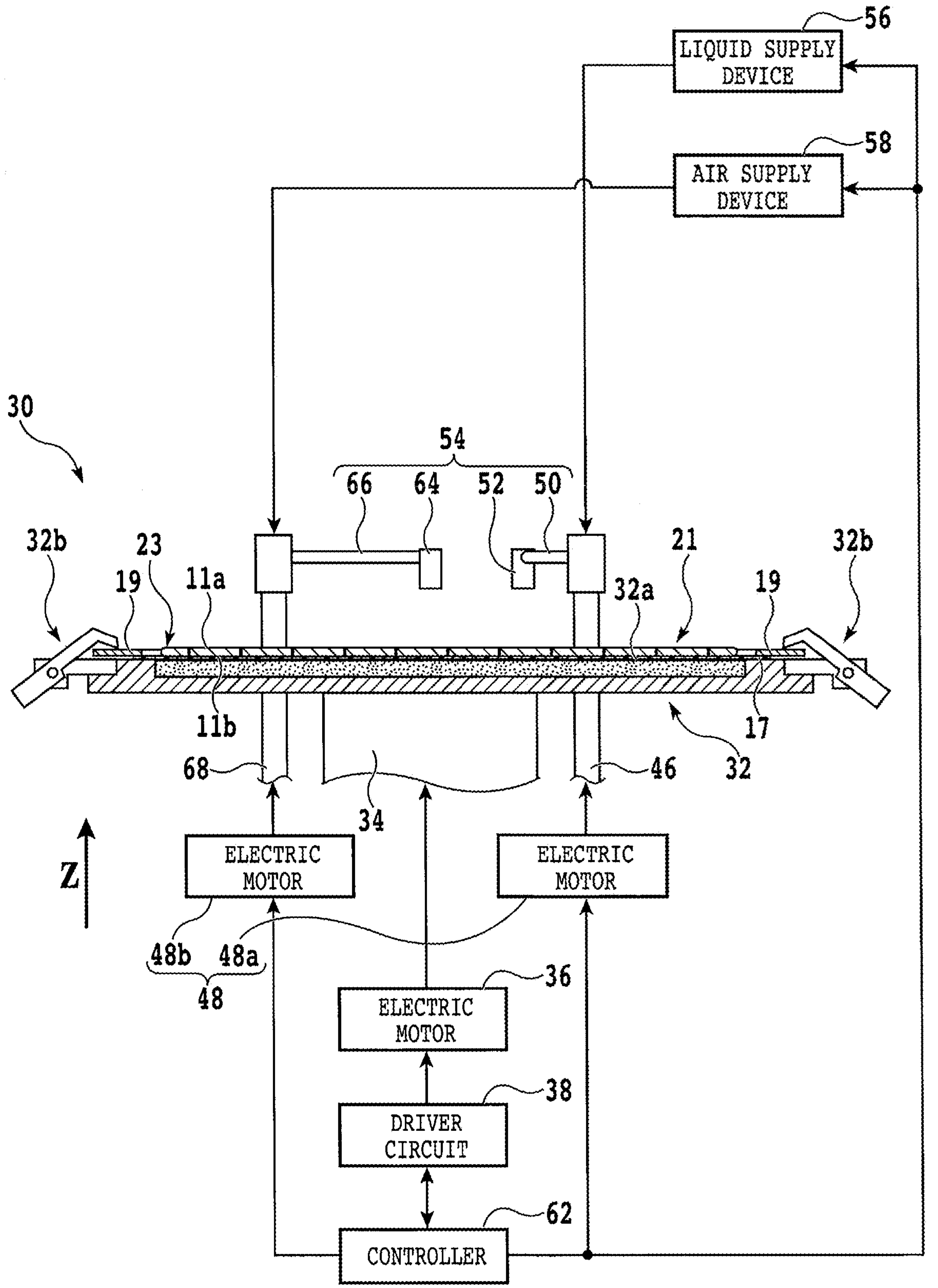
FIG. 16 is an enlarged side elevational view, partly in cross section and in block form, illustrating a modified cleaning unit having two nozzles.

FIG. 16 illustrates is a modified cleaning unit 54 having two nozzles 52 and 64 in enlarged side elevation view, partly in cross section and in block form. As illustrated in FIG. 16, the nozzle 64 is fixed to the distal end of an arm 66 with its ejection port oriented directly below. As with the first embodiment, the ejection ports of the nozzles 52 and 64 may be slightly inclined to the Z-axis. The arm 66 extending perpendicularly to a rotational shaft 68 has a proximal end fixed to an upper end portion of the rotational shaft 68.

The nozzle 52 and the arm 50 and the nozzle 64 and the arm 66 jointly make up a cleaning unit 54. The rotational shaft 68 has a lower end coupled to an electric motor 48*b* that rotates the rotational shaft 68 about its longitudinal central axis through a predetermined angular range. The electric motor 48*b* is substantially identical in structure to the electric motor 48*a*.

According to the modification illustrated in FIG. 16, the electric motors 48*a* and 48*b* jointly make up a swinging mechanism 48. In the local region cleaning step S30, the nozzle 52 ejects the pure water (first fluid) 52*a*, and in the local region drying step S50, the nozzle 64 ejects the air (second fluid) 52*b*. However, the nozzle 52 may eject liquid other than the pure water 52*a* or gas-liquid mixture.

For carrying out the local region cleaning step S30, the nozzle 52 that is ejecting the pure water 52*a* is swung over the holding surface 32*a*, and the nozzle 64 stands by at rest radially outwardly of the holding surface 32*a*. For carrying out the local region drying step S50, the nozzle 64 that is ejecting the air 52*b* is swung over the holding surface 32*a*. In other words, the air 52*b* ejected from the nozzle 64 moves relatively to the rotational shaft 34 of the spinner table 32. During this time, the nozzle 52 stands by at rest radially outwardly of the holding surface 32*a*.

Although not illustrated in FIG. 16, the nozzle 64 may alternatively eject the pure water (first fluid) 52*a*, liquid, or gas-liquid mixture, whereas the nozzle 52 may eject the air (second fluid) 52*b*. The structural and methodical details according to the above embodiments may be modified to practice without departing from the scope of the present invention. The spinner cleaning apparatus 30 may not be part of the cutting apparatus 2, but may be a cleaning apparatus that is separate from and independent of the cutting apparatus 2.

Instead of the swinging mechanism 48 for swinging the nozzles 52 and 64, ball-screw-type first and second moving mechanisms, not depicted, may be used to move the nozzles 52 and 64 straight in the XY plane. These alternative first and second moving mechanisms are each capable of moving the fluid ejected from each of the nozzles 52 and 64 straight back and forth in the XY plane. The first moving mechanism is arranged to move the nozzles 52 and 64 straight along a predetermined direction (e.g., along the X-axis) in the XY plane, and the second moving mechanism is arranged to move the nozzles 52 and 64 straight along another direction (e.g., along the Y-axis) perpendicular to the predetermined direction in the XY plane.

Consequently, the moving mechanisms are each able to move the fluid ejected from each of the nozzles 52 and 64 along a straight path that extends from the outer circumferential edge 32*d* of the spinner table 32 to the center 32*c* thereof or along a straight path that extends from the outer circumferential edge of the clean-up target 23 held under suction on the holding surface 32*a* to the center 32*c* of the holding surface 32*a*.

Moreover, since the controller 62 is recognizing at all times the orientation 25 of the clean-up target 23 introduced into the spinner cleaning apparatus 30, the angle through which the spinner table 32 rotates, the initial position of the nozzle 52, and the distance that the swinging mechanism 48 moves the nozzle 52, the microscope camera unit 60 may be omitted from installation. If the microscope camera unit 60 is not installed in the spinner cleaning apparatus 30, then the controller 62 controls operation of the nozzles 52 and 64 and the spinner table 32 on the basis of the information representing the diameter of the clean-up target 23 and the pitch of the cut grooves 13*a*, for example.

The clean-up target 23 has the cut grooves 13*a* formed in the workpiece 11 by the cutting process. However, the clean-up target 23 may have laser-processed grooves formed in the workpiece 11 along the projected dicing lines 13 by a pulsed laser beam having a wavelength that is absorbable by the workpiece 11.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of cleaning a clean-up target with a spinner cleaning apparatus, comprising:

a holding step of holding the clean-up target on a holding surface of a holding table of the spinner cleaning apparatus, the holding table being rotatable about a rotational shaft perpendicular to the holding surface; and a first treating step of cleaning or drying a local region of the clean-up target held on the holding surface of the holding table with first fluid supplied from a first nozzle of the spinner cleaning apparatus by combining turning of the holding table about the rotational shaft through an indicated rotational angle and movement of the first nozzle relative to the rotational shaft with each other, wherein the indicated rotational angle is less than 90 degrees.

2. A method of cleaning a clean-up target with a spinner cleaning apparatus, comprising:

a holding step of holding the clean-up target on a holding surface of a holding table of the spinner cleaning apparatus, the holding table being rotatable about a rotational shaft perpendicular to the holding surface; and a first treating step of cleaning or drying a local region of the clean-up target held on the holding surface of the holding table with first fluid supplied from a first nozzle of the spinner cleaning apparatus by combining turning of the holding table about the rotational shaft through an indicated rotational angle and movement of the first nozzle relative to the rotational shaft with each other, and wherein the first treating step includes cleaning or drying the clean-up target held on the holding surface of the holding table with the first fluid along a straight clean-up region thereof by combining turning of the holding table through the rotational angle and movement of the first nozzle relative to the rotational shaft with each other.

3. The method according to claim 2, wherein:

the clean-up region corresponds to a straight projected dicing line on an upper surface of the clean-up target, and the first treating step includes cleaning or drying the clean-up target with the first fluid along the projected dicing line.

4. The method according to claim 2, wherein:

the clean-up region corresponds to a straight projected dicing line on an upper surface of the clean-up target, and the first treating step includes cleaning or drying the clean-up target with the first fluid at least at a longitudinal end of the projected dicing line.

5. The method according to claim 1, further comprising:

after the holding step and before the first treating step, a second treating step of cleaning the overall region of an upper surface of the clean-up target by ejecting second fluid from a second nozzle of the spinner cleaning apparatus while rotating the holding table that is holding the clean-up target on the holding surface thereof about the rotational shaft at an indicated rotational speed and by moving the second fluid ejected from the second nozzle relatively to the holding table along a path that extends from an outer circumferential edge of the holding table or an outer circumferential edge of the clean-up target held on the holding surface to the center of the holding table.

6. The method according to claim 1, wherein:

the first treating step includes cleaning the local region of the clean-up target with the first fluid, the method further comprising:

after the holding step, a second treating step of cleaning the overall region of an upper surface of the clean-up target by ejecting second fluid from a second nozzle of the spinner cleaning apparatus while rotating the holding table that is holding the clean-up target on the holding surface thereof about the rotational shaft at an indicated rotational speed and by moving the second fluid ejected from the second nozzle relatively to the holding table along a path that extends from an outer circumferential edge of the holding table or an outer circumferential edge of the clean-up target held on the holding surface to the center of the holding table.

7. The method according to claim 5, wherein, in a case where the first fluid cleans the local region of the clean-up target in the first treating step, the first fluid includes pure water, the method further comprising:

after the first treating step, a local region drying step of drying the local region that has been cleaned with air that is different from the first fluid by combining turning of the holding table through the rotational angle and movement of the first nozzle relative to the rotational shaft with each other.

8. The method according to claim 6, wherein, in a case where the first fluid cleans the local region of the clean-up target in the first treating step, the first fluid includes pure water, the method further comprises:

after the first treating step, a local region drying step of drying the local region that has been cleaned with air that is different from the first fluid by combining turning of the holding table through the rotational angle and movement of the first nozzle relative to the rotational shaft with each other.

* * * * *